United States Patent
Kawasaki et al.

(10) Patent No.: US 6,618,330 B1
(45) Date of Patent: Sep. 9, 2003

(54) MAGNETO-OPTICAL HEAD AND METHOD OF MAKING COIL FOR THE SAME

(75) Inventors: Goro Kawasaki, Kawasaki (JP); Tsuyoshi Matsumoto, Kawasaki (JP); Kazushi Uno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/794,369

(22) Filed: Feb. 27, 2001

(30) Foreign Application Priority Data

Sep. 7, 2000 (JP) ........................................ 2000-271208

(51) Int. Cl.[7] .............................................. G11B 11/00
(52) U.S. Cl. .................................. 369/13.23; 369/13.33
(58) Field of Search ......................... 369/300, 112.24, 369/13.23, 13.33

(56) References Cited

U.S. PATENT DOCUMENTS

| | | | | |
|---|---|---|---|---|
| 5,402,293 A | * | 3/1995 | Smith | 369/13.1 |
| 5,544,131 A | * | 8/1996 | Albertini et al. | 369/13.17 |
| 5,831,797 A | * | 11/1998 | Schaenzer et al. | 369/13.12 |
| 5,978,320 A | | 11/1999 | Nakaoki et al. | 369/13 |
| 6,064,632 A | | 5/2000 | Nakaoki et al. | 369/13 |
| 6,130,779 A | * | 10/2000 | Carlson et al. | 359/566 |

FOREIGN PATENT DOCUMENTS

| | | | | |
|---|---|---|---|---|
| JP | 10255205 A | * | 9/1998 | G11B/5/02 |
| JP | 10-320863 | | 12/1998 | |
| JP | 11120644 A | * | 4/1999 | G11B/11/10 |
| JP | 11162034 A | * | 6/1999 | G11B/11/10 |
| JP | 11-232718 | | 8/1999 | |
| JP | 076724 | | 3/2000 | |
| JP | 2001184748 A | * | 7/2001 | G11B/11/105 |
| JP | 2001266431 A | * | 9/2001 | G11B/11/105 |
| WO | 98/48418 | | 10/1998 | |

* cited by examiner

*Primary Examiner*—William Klimowicz
(74) *Attorney, Agent, or Firm*—Greer, Burns & Crain, Ltd.

(57) ABSTRACT

A magneto-optical head includes a slider, an objective lens, a coil and a transparent insulating layer. The coil is provided with upper and lower conductive patterns, wherein the lower pattern is brought closer to a storage medium than the upper pattern is. The lower pattern is made smaller in inner diameter than the upper pattern. The insulating layer fills the center of the coil.

16 Claims, 21 Drawing Sheets

MAGNETO-OPTICAL HEAD AND METHOD OF MAKING COIL FOR THE SAME

BACKGROUND OF THE INVENTION

1. Field of the Invention

The present invention relates to a magneto-optical head used for writing data to or reading data from a magneto-optical data storage medium. The invention also relates to a method of making a coil used for such an MO head.

2. Description of the Related Art

As is known, a magneto-optical disk stores data magnetically, like a hard disk. Writing to an MO disk is first done by heating a portion of the disk with a laser beam. When the disk medium reaches a certain temperature (known as Curie temperature) it loses its magnetic coercivity. Then, with the use of an MO read/write head, a magnetic field is applied to the heated portion, thereby reorienting the magnetic field of the appropriate domains. This means that the data is stored.

The recorded data is read from the disk using a polarized laser beam. When the polarized light hits the magnetic domains on the disk, the direction of polarization is altered, in accordance with the direction of the magnetic field of the domain. In this way, the differences in the magnetic orientation of the domains are detected, whereby the data can be read.

A conventional MO head is disclosed in JP-A-2000-76724 for example. As shown in FIG. 11 of the accompanying drawings, the conventional MO head includes an objective 90 and a transparent plate 91 which are carried by a nonillustrated slider. The plate 91 is provided with a downward, transparent projection 92 aligned with the optical axis Ca of the lens 90. The projection 92 has substantially the same refractive index as the plate 91. Around the projection 92 is provided a coil 93 consisting of two conductive patterns 93a for generating a required magnetic field. The coil 93 is covered by a transparent insulating layer 97.

In operation, as shown in FIG. 12A, a laser beam passes through the lens 90 and the projection 92, and reaches the MO disk D, to form a small laser spot Ls. In the figure, the distance between the lower surface of the plate 91 and the upper surface of the disk D is designated by h. The diameter of the laser beam passing from the plate 91 to the projection 92 is designated by D1.

Due to the projection 92, the diameter of the laser beam passing through the plate 91 can be made smaller than when no such projection is provided. Specifically, without the projection 92, the laser beam is refracted to a certain degree upon leaving the plate 91 into the air, as shown in FIG. 12B. To compensate for the refraction and form an appropriately small laser spot on the disk D, the diameter D2 of the laser beam needs to be larger than the diameter D1 of FIG. 12A (here the distance between the plate 91 and the disk D is supposed to be the same for the two cases shown in FIGS. 12A and 12B)

With the projection 92, however, the laser beam is allowed to travel straight upon leaving the plate 91, as shown in FIG. 12A, whereby the diameter D1 is relatively small. Accordingly, the inner diameter of the coil 93 is reduced, which is advantageous to generating a required magnetic field with a smaller amount of current.

Though having such an advantageous feature, the conventional MO head has a downside as well. First, it takes an extra time to form the projection 92 on the plate 91. Second, it may be difficult to form the projection 92 with accuracy. Third, the inner diameter of the coil 93 cannot be made smaller than the diameter of the projection 92.

Another example of conventional MO head is disclosed in JP-A-10(1998)-320863. As shown in FIG. 13 of the accompanying drawings, the MO head includes an objective lens 90 formed integral with a projection 92, and a coil 93 arranged around the projection 92. Clearly, this conventional MO head also suffers the same problems as the MO head of FIG. 11.

SUMMARY OF THE INVENTION

The present invention has been proposed under the circumstances described above. Therefore, an object of the present invention is to provide an MO head capable of applying a desired magnetic field to the heated portion of the disk more efficiently than is conventionally possible. Another object of the present invention is to provide a method of making a coil used for an MO head.

According to a first aspect of the present invention, there is provided a magneto-optical head including: a slider held in facing relation to a storage medium; an objective lens supported by the slider for concentrating light rays; a coil provided with a center through which the light rays pass, the coil including a first conductive pattern and a second conductive pattern which is closer to the storage medium than the first conductive pattern is; and a transparent insulating layer enclosing the coil. The second conductive pattern is smaller in inner diameter than the first conductive pattern. The insulating layer is arranged to fill the center of the coil.

In accordance with a preferred embodiment, the MO head may further include a transparent substrate disposed between the objective lens and the storage medium, and the coil may be provided on this substrate.

Preferably, the substrate and the insulating layer may have substantially the same refractive indexes.

Preferably, the transparent substrate may be provided with via-holes connected to the first and the second conductive patterns.

For reducing the overall size of the MO head, the first conductive pattern may be embedded in the transparent substrate.

In accordance with another preferred embodiment, the coil may be directly provided on the objective lens.

Preferably, each of the first and the second conductive patterns may be provided with a plurality of turns.

Preferably, the turns of the first conductive pattern may be offset radially of the coil from the turns of the second conductive pattern.

Preferably, the coil may include a connecting piece for connecting an inner turn of the first conductive pattern to an inner turn of the second conductive pattern.

Preferably, the coil may further include a first outgoing line connected to an outer turn of the first conductive pattern, and a second outgoing line connected to an outer turn of the second conductive pattern.

In addition to the first and the second conductive patterns, the coil may include third and fourth conductive patterns arranged between the first and the second patterns, wherein the third and the fourth conductive patterns are smaller in inner diameter than the first conductive pattern but greater in inner diameter than the second conductive pattern.

When the four conductive patterns are used, the coil may be provided with three auxiliary connecting pieces: a first connecting piece for connecting an inner end of the first conductive pattern to an inner end of the third conductive pattern, a second connecting piece for connecting an outer end of the third conductive pattern to an outer end of the fourth conductive pattern, and a third connecting piece for connecting an inner end of the fourth conductive pattern to an inner end of the second conductive pattern.

According to a second aspect of the present invention, there is provided a method of making a coil for a magneto-optical head. The method may include the steps of: forming a first conductive pattern on a transparent substrate; forming a first transparent insulating layer filling a center of the first conductive pattern; forming a second conductive pattern on the first insulating layer, the second conductive pattern being smaller in inner diameter than the first conductive pattern; and forming a second transparent insulating layer filling a center of the second conductive pattern.

Preferably, the method may further include the step of flattening a surface of the first insulating layer before the second conductive pattern is formed.

In accordance with a preferred embodiment, the method may further include the step of forming a first recess in the substrate for accommodating the first conductive pattern in the substrate.

In accordance with another preferred embodiment, the step of forming the second conductive pattern may include the sub-steps of: forming on the first insulating layer a third transparent insulating layer provided with a hole; forming a fourth transparent insulating layer to cover the third insulating layer; etching the fourth insulating layer and a part of the first insulating layer via the hole of the third insulating layer, so that a second recess corresponding to the second conductive pattern is formed in the fourth insulating layer, and that a through-hole communicating with the second recess is formed in the first and the third insulating layers; and supplying a conductive material for filling the second recess and the through-hole.

Other features and advantages of the present invention will become apparent from the detailed description given below with reference to the accompanying drawings.

BRIEF DESCRIPTION OF THE DRAWINGS

FIG. 12A shows the function of a downward projection of the conventional MO head, while

DETAILED DESCRIPTION OF THE PREFERRED EMBODIMENTS

The preferred embodiments of the present invention will be described below with reference to the accompanying drawings.

Reference is first made to FIGS. 1–4 illustrating a magneto-optical (MO) head H1 according to a first embodiment of the present invention.

Figure 1:
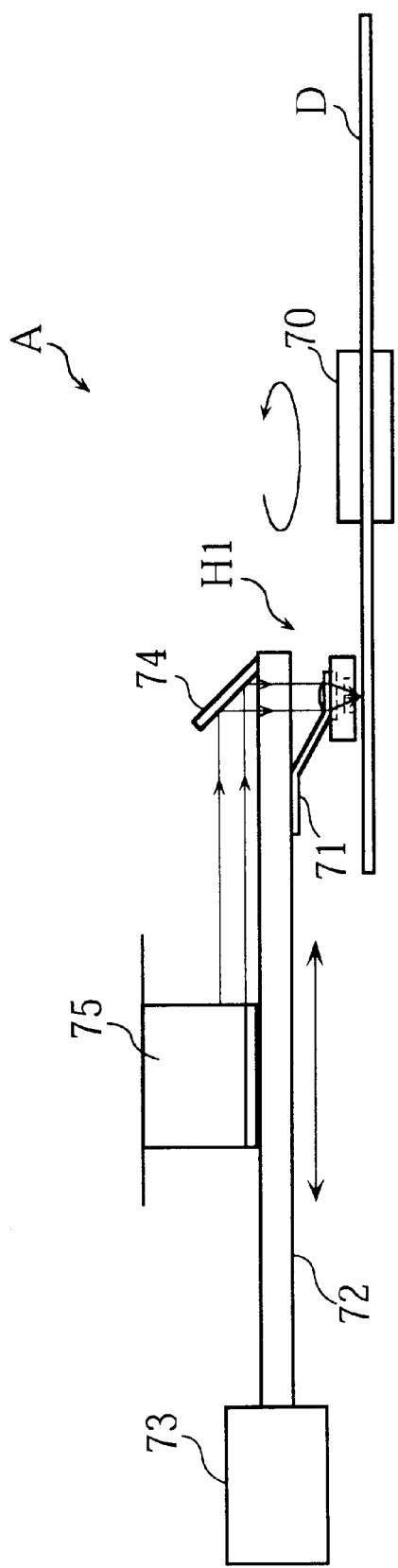
FIG. 1 is a schematic view showing the principal components of a magneto-optical disk apparatus incorporating an MO head according to a first embodiment of the present invention.

FIG. 1 shows the principal components of an MO disk apparatus A incorporating the MO head H1. As illustrated, the apparatus A includes a spindle 70, a suspension 71, an arm 72, an actuator 73, a mirror 74, and an optical module 75. Specifically, the spindle 70 supports an MO disk D and rotates the diskDat high speed. The suspension 71 supports, at its inner end, the head H1 in a manner such that the head H1 is held in facing relation to the recording layer of the disk D. The suspension 71 is attached, at its outer end, to the arm 72. The arm 72 is moved linearly or non-linearly in a horizontal plane by the actuator 72. Accordingly, the head H1 is moved relative to the disk D. The mirror 74 is mounted on the inner end of the arm 72. Though not shown, the optical module 75 includes a laser beam emitting unit, a detector, a collimator, etc. The laser beam emitted from the module 75 is reflected on the mirror 74 to be directed toward the head H1.

Figure 2:
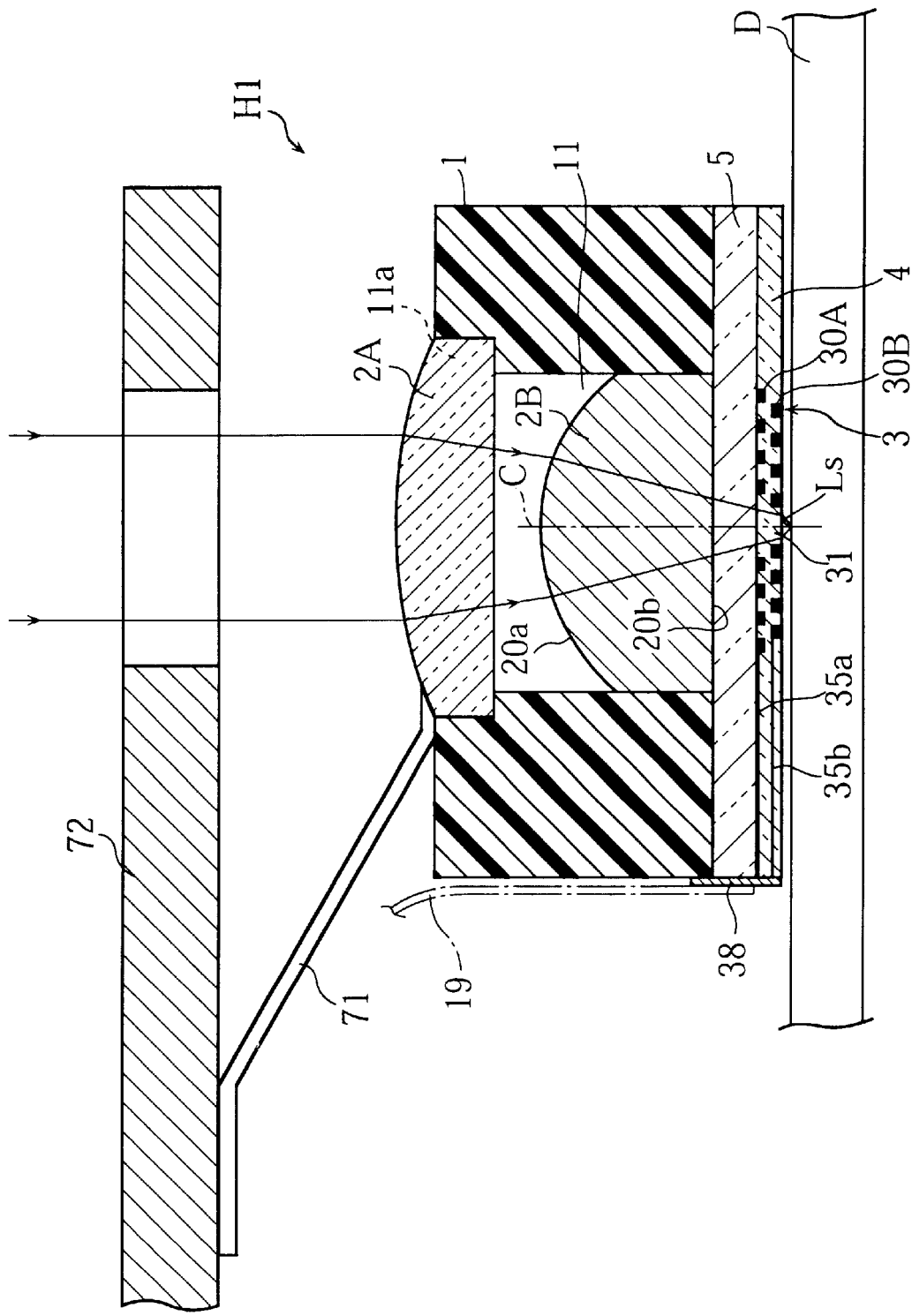
FIG. 2 is a sectional view showing the MO head shown in FIG. 1.

As shown in FIG. 2, the head H1 includes a slider 1, a first objective 2A, a second objective 2B, a coil 3, a transparent insulating layer 4, and a transparent plate 5.

The slider 1, which may be made of a resin, is formed with a through-hole 11. When the disk D is at rest, the slider 1 is held in contact with the disk by the urging force of the suspension 71. When the disk D is rotated at high speed, the slider 1 is caused to float over the disk D by the action of the air introduced into the space between the slider 1 and the rotating disk D.

The first objective 2A is arranged at an enlarged, upper portion 11a of the through-hole 11, while the second objective 2B is arranged at a lower portion of the through-hole 11 in facing relation to the first objective 2A. The second objective 2B is provided with a spherical upper lens surface 20a and with a flat lower lens surface 20b. Using two separate objectives 2A, 2B in the illustrated manner serves to increase the numerical aperture (NA) of the optical system of the head H1, thereby improving the recording density of the disk D.

Figure 3:
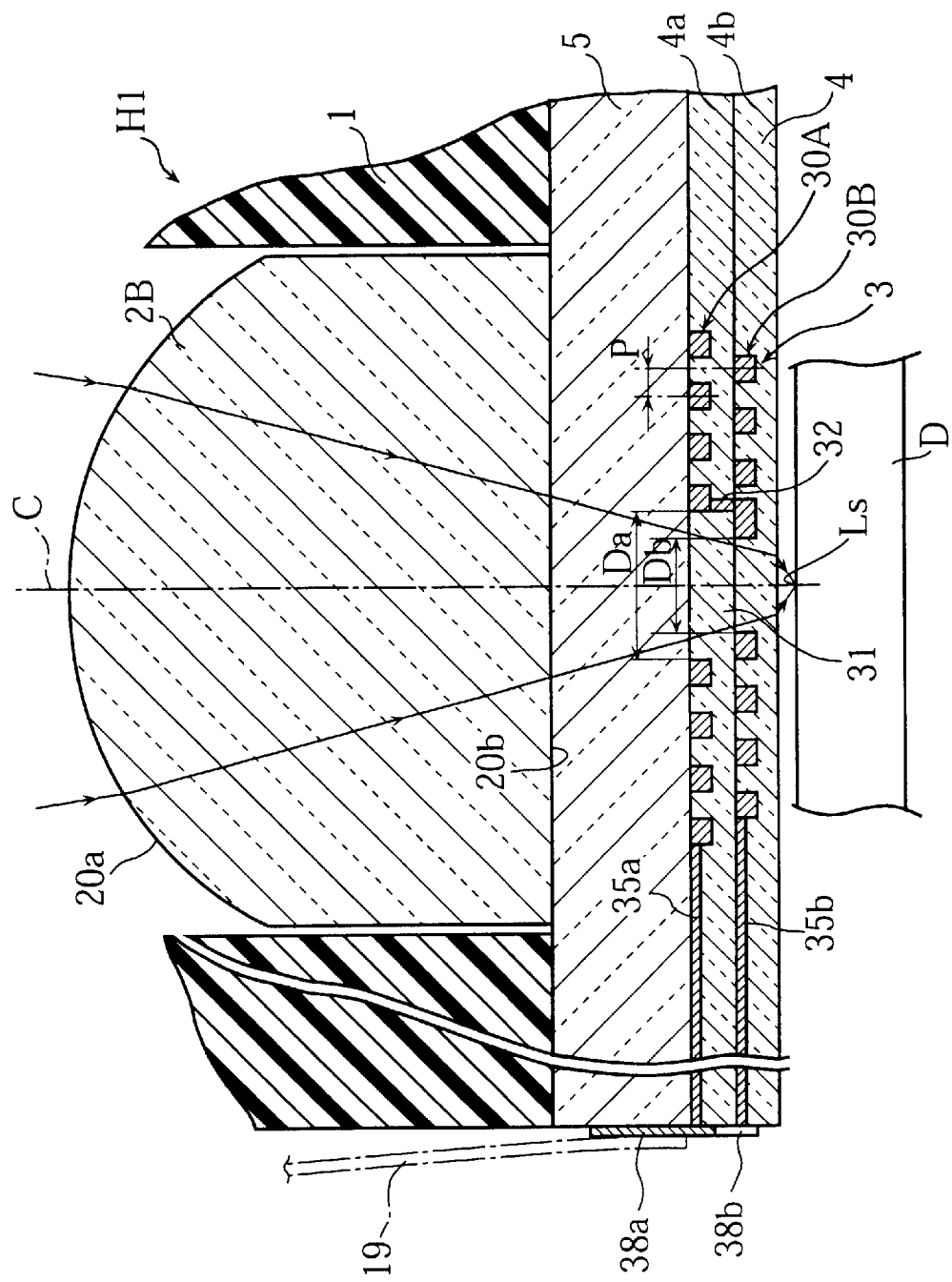
FIG. 3 is an enlarged sectional view showing the MO head of FIG. 2.

The rectangular transparent plate 5 may be made of the same glass material as used for forming the first and the second objectives 2A, 2B. The thickness of the plate 5 may be about 0.2 mm. The plate 5 is attached to the bottom surface of the slider 1. As shown in FIGS. 2 and 3, the upper surface of the plate 5 is held in close contact with the lower lens surface 20b of the second objective 2B.

Figure 4A:
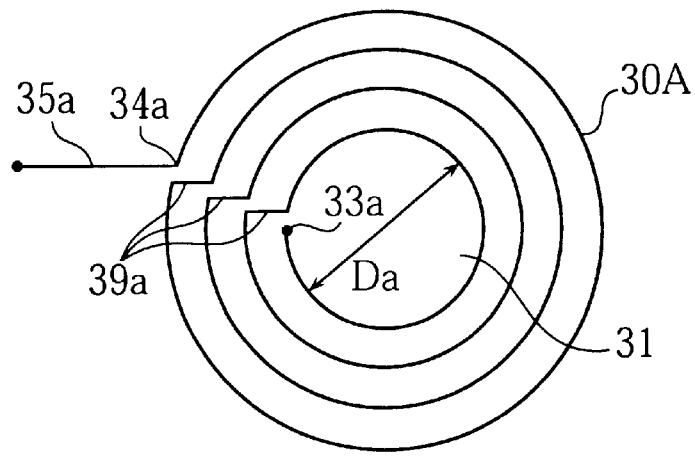
FIGS. 4A–4C show two conductive patters of the coil used for the MO head.
Figure 4B:
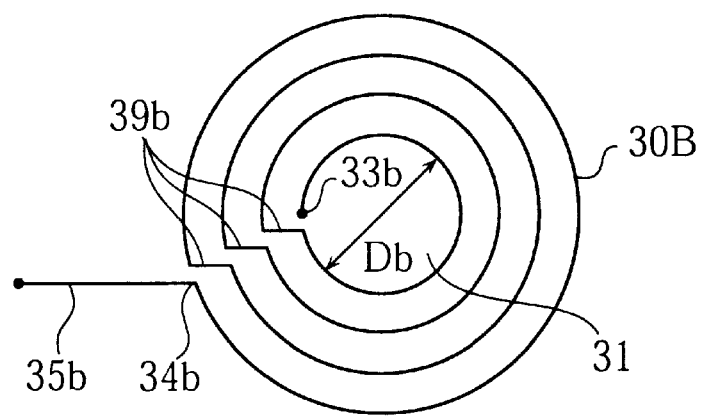
Figure 4C:
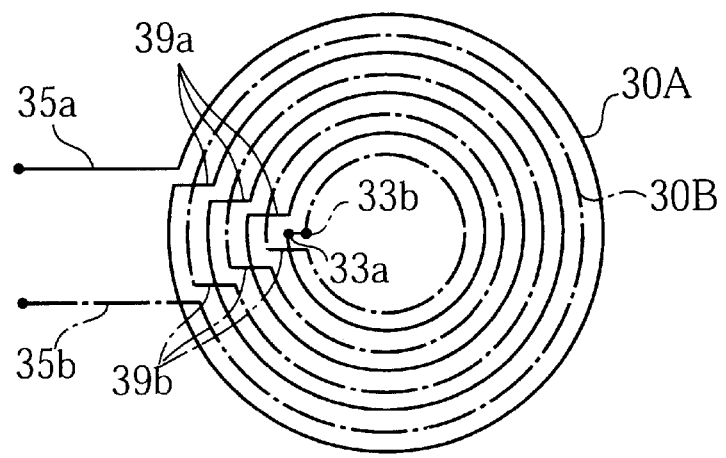

The coil 3 consists of a first pattern 30A and a second pattern 30B both of which may be made of copper. The first a pattern 30A is formed on the lower surface of the transparent plate 5. The second pattern 30B is arranged below the first pattern 30A. As shown in FIG. 4A, the first pattern 30A includes a plurality of concentric, circular portions or turns which are connected to each other via connecting portions 39a. Similarly, as shown in FIG. 4B, the second pattern 30B includes a plurality of concentric, circular portions or turns which are connected to each other via connecting portions 39b.

As shown in FIG. 3, the coil 3 has a central axis coinciding with the optical axis C of the second objective 2B. To allow the laser beam to pass through the center 31 of the coil 3, the first and the second conductive patters 30A, 30B have sufficiently large inner diameters Da and Db, respectively. The inner diameter Da of the first pattern 30A is greater than the inner diameter Db of the second pattern 30B.

The circular portions of the first pattern 30A are horizontally offset from the counterparts of the second pattern 30B by a predetermined distance P, as shown in FIG. 3. Thus, as viewed in the vertical direction (see FIG. 4C), the circular portions of the first pattern 30A do not overlap with the circular portions of the second pattern 30B.

As shown in FIGS. 3 and 4, the inner end 33a of the first pattern 30A is connected to the inner end 33b of the second pattern 30B via a connecting piece 32. The outer end 34a of the first pattern 30A is connected to a first outgoing line 35a extending radially of the coil 3. Similarly, the outer end 34b of the second pattern 30B is connected to a second outgoing line 35b extending radially of the coil 3.

The transparent insulating layer 4 has a refractive index which is generally the same as those of the second objective 2B and the transparent plate 5. The layer 4 may be made of a transparent material such as aluminum oxide, aluminum nitride, amorphous carbon (diamond like carbon), silicon oxide or silicon nitride. The layer 4 encloses the coil 3 and is attached to the lower surface of the transparent plate 5. To be precise, the layer 4 consists of two overlapping sub-layers: a first sub-layer 4a to enclose the first pattern 30A and a second sub-layer 4b to enclose the second pattern 30B. As shown in FIG. 3, the first outgoing line 35a extends through the first sub-layer 4a to be exposed therefrom, and the second outgoing line 35b extends through the second sub-layer 4b to be exposed therefrom. At their exposed ends, the first outgoing line 35a is connected to a first terminal 38a, while the second outgoing line 35b is connected to a second terminal 38b. These terminals 38a, 38b, which may be made of copper, are connected to a power supply conductor 19. In operation, power is supplied to the coil 3 through the conductor 19, the terminals 38a and 38b, and the outgoing lines 35a and 35b.

The function of the above head H1 will now be described below.

In operation, as stated previously, the slider 1 is caused to float above the rotating disk D. The gap between the disk surface and the transparent layer 4 of the floating head H1 is in the order of micron or submicron. According to the first embodiment, as shown in FIG. 3, the conductor 19 for supplying power to the coil 3 is directed away from the transparent layer 4, so that it does not extend into the gap between the disk surface and the layer 4. Accordingly, the gap can be made small enough to bring the coil 3 appropriately close to the laser spot Ls formed on the disk surface. In this manner, it is possible to apply a strong magnetic field to the disk D at the position of the laser spot Ls.

As shown in FIG. 2, the laser beam emitted from the optical module 75 (FIG. 1) is caused to converge by the first objective 2A and the second objective 2B. After having passed through the second objective 2b, the laser beam enters the transparent plate 5 and also the transparent layer 4, passing through the center 31 of the coil 3 and finally reaching the disk D. According to the first embodiment, the transparent layer 4 and plate 5 have a generally equal refractive index, which is greater than the refractive index of the air. Thus, the layer 4, which fills the center 31 of the coil 3, serves the same purpose as the protruding portion 92 of the conventional MO head shown in FIG. 21 or 23. This means that in the head H1, the laser beam passing through the center 31 of the coil 3 can have an appropriately small diameter. Accordingly, the inner diameter of the coil 3 can also be made small.

Further, in the MO head H1, the coil 3 does not need to be provided around a preexisting solid object like the protrusion 92 of the prior art. Therefore, the inner diameter of the coil 3 can be made smaller than is conventionally possible. Still further, the inner diameter Db of the second pattern 30B is made smaller than the inner diameter Da of the first pattern 30A. In this manner, the coil 3 as a whole can be brought close to the light passage without interfering with the laser beam.

In the MO head H1, the inner ends of the first and second patterns 30A, 30B are connected to each other via the vertical connecting piece 32, while their outer ends are connected to the first and the second outgoing lines 35a, 35b, which extend radially outward from the center of the coil 3. Thus, the laser beam passing through the center of the coil 3 does not interfere with the connecting piece 32 or the outgoing lines 35a, 35b.

Due to the above-described features, the coil 3 of the MO head H1 can have an advantageously small inner diameter. As a result, a strong magnetic field generated by the coil 3 is effectively applied to and around the laser spot Ls on the disk D. Also, the small inner diameter allows the entire coil 3 to be made small, which is advantageous to reducing the power consumption of the coil 3. When the current passing through the coil 3 is reduced, the breakage of the coil 3 due to electromigration can be prevented.

In the MO head H1, the coil 3 is made up of two conductive patterns 30A, 30B. Thus, as compared to a coil consisting of a single conductive pattern, the two-layered coil 3 has a smaller inductance and is capable of properly responding to high frequency signals. Further, since the two patterns 30A and 30B are offset from each other in the radial direction of the coil 3, the capacitive coupling between the two patterns is restricted, thereby reducing the stray capacitance of the coil 3.

Figure 5A:
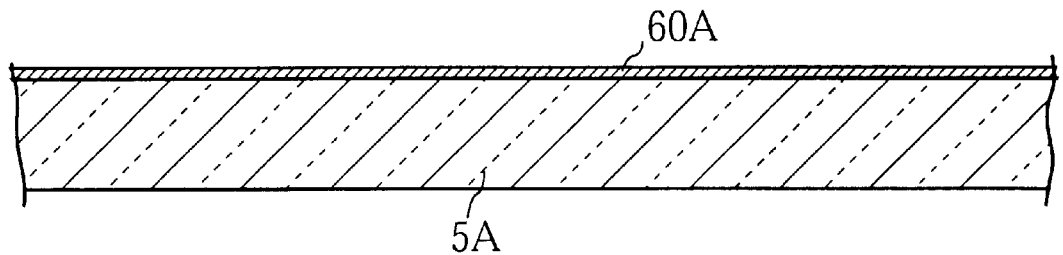
FIGS. 5A–5Q show how the coil of the MO head can be made.
Figure 5B:
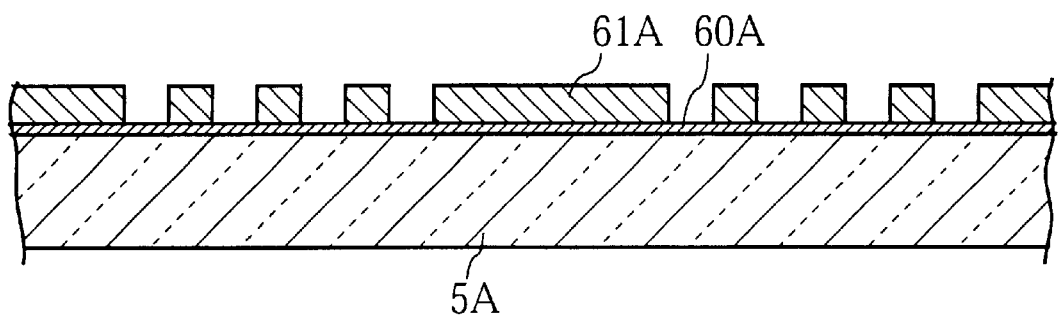
Figure 5C:
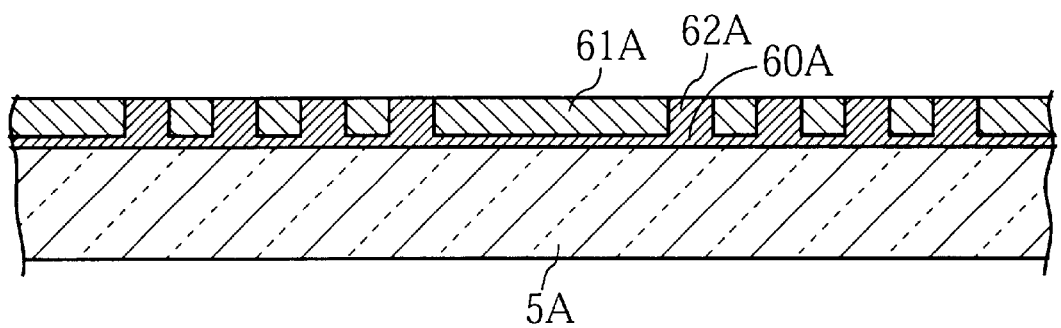
Figure 5D:
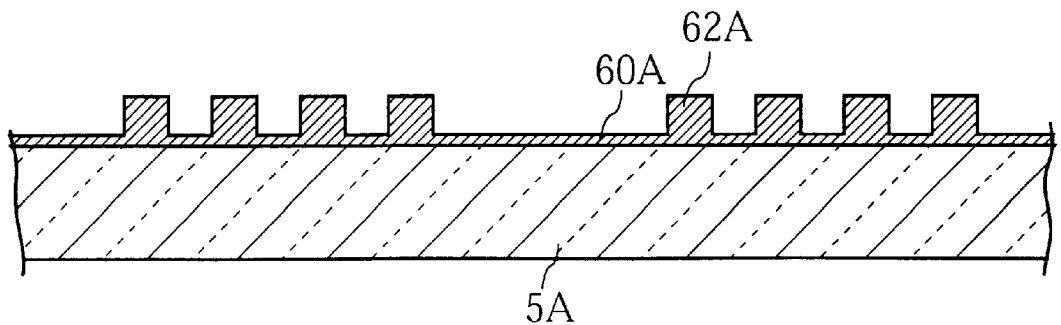
Figure 5E:
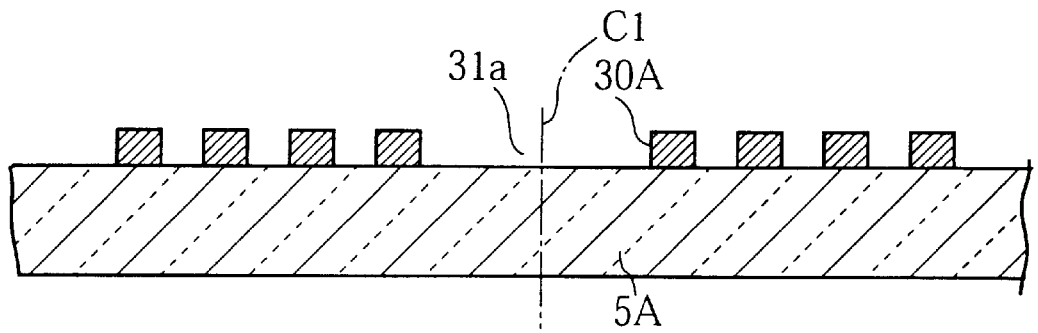
Figure 5F:
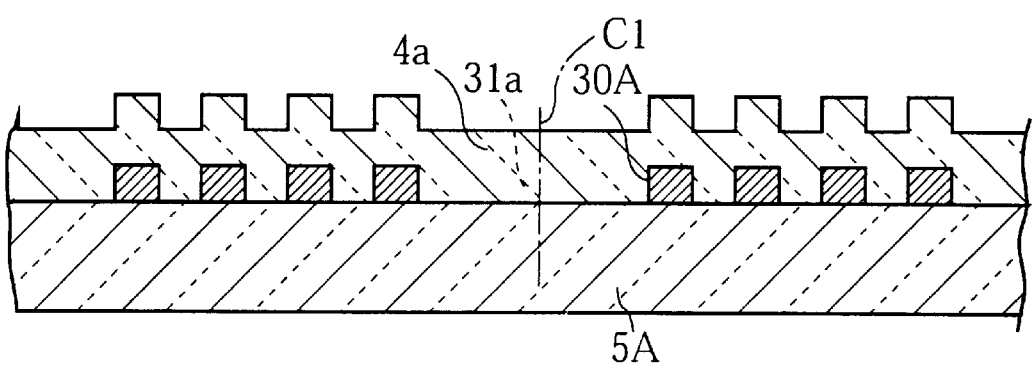
Figure 5G:
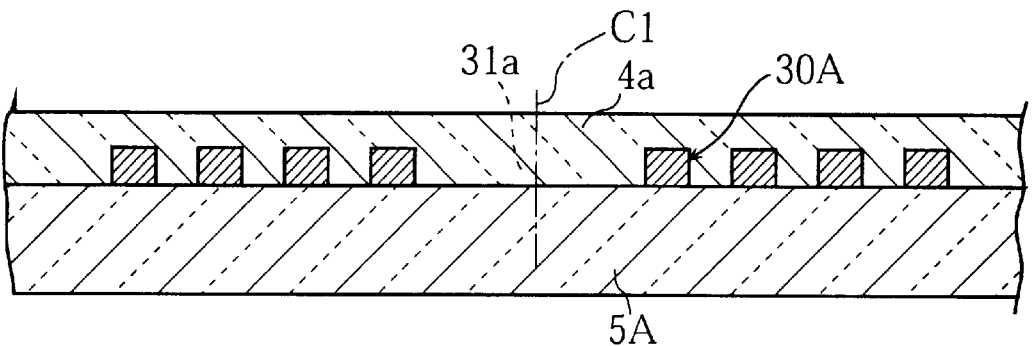
Figure 5H:
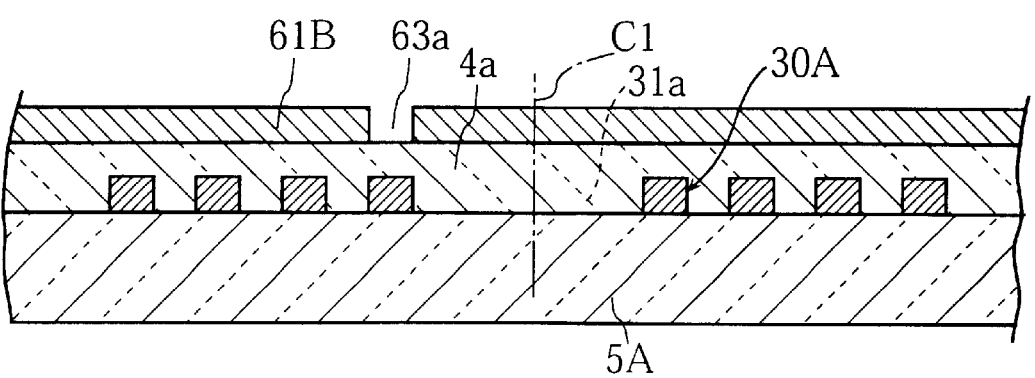
Figure 5I:
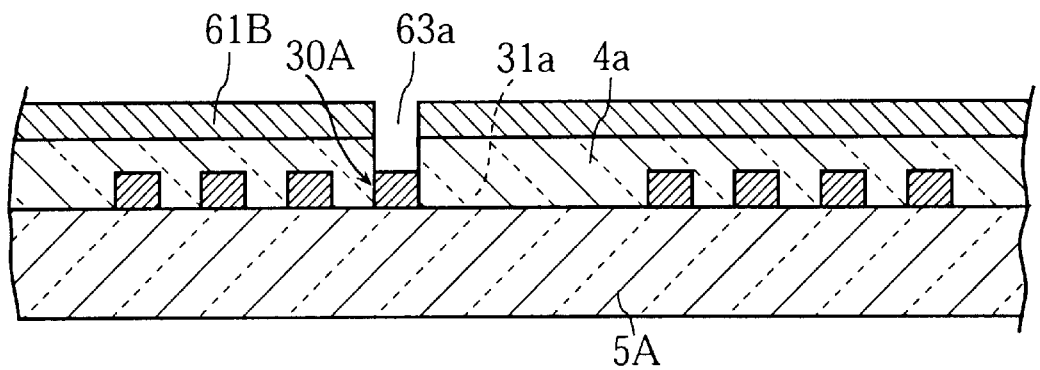
Figure 5J:
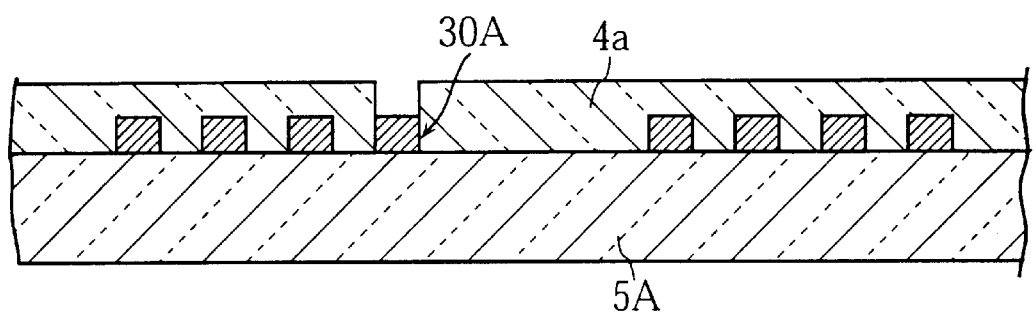
Figure 5K:
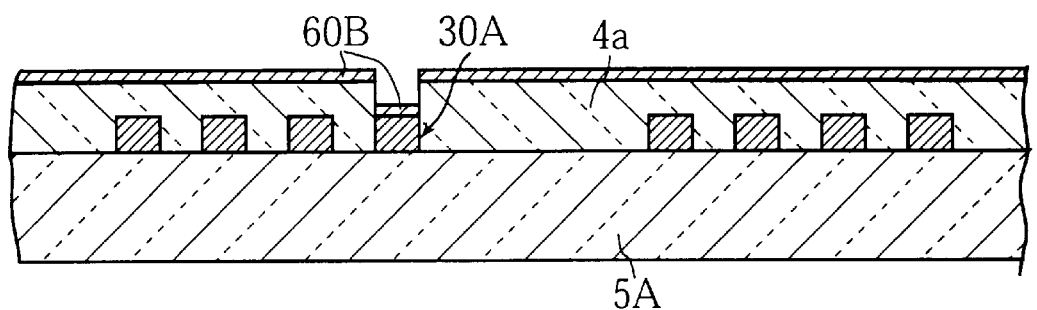
Figure 5L:
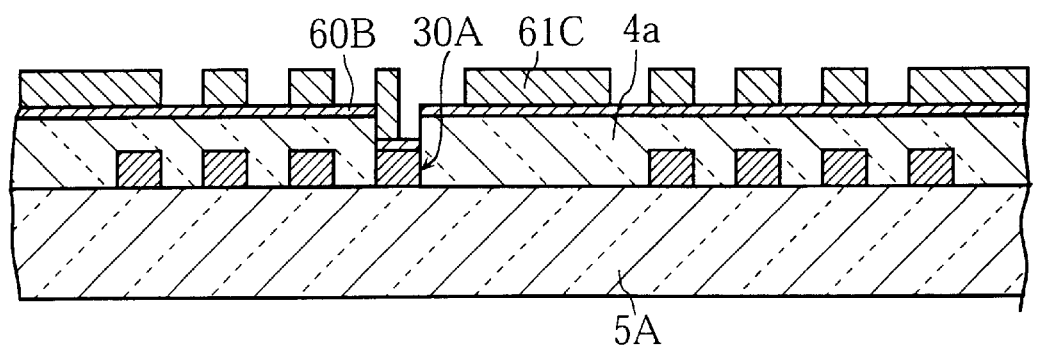
Figure 5M:
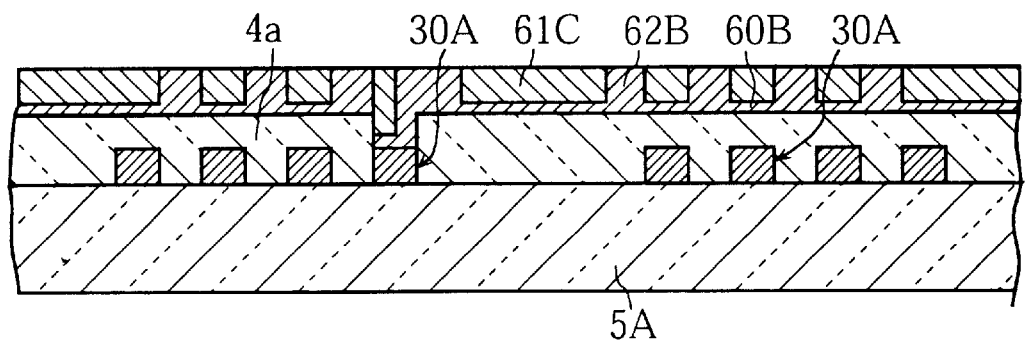
Figure 5N:
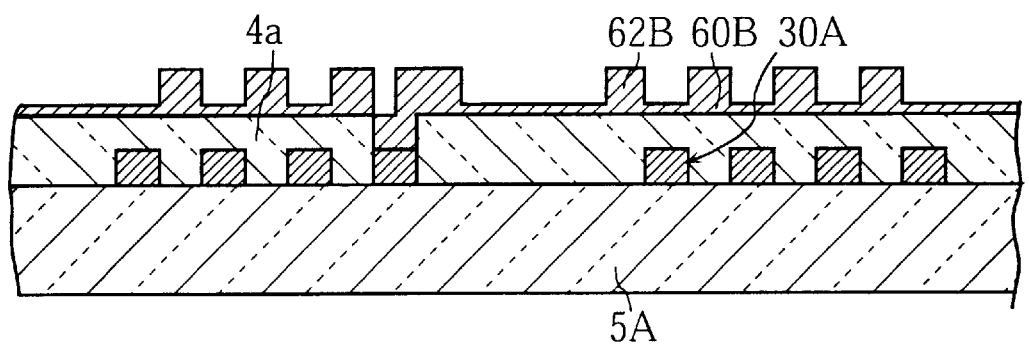
Figure 5O:
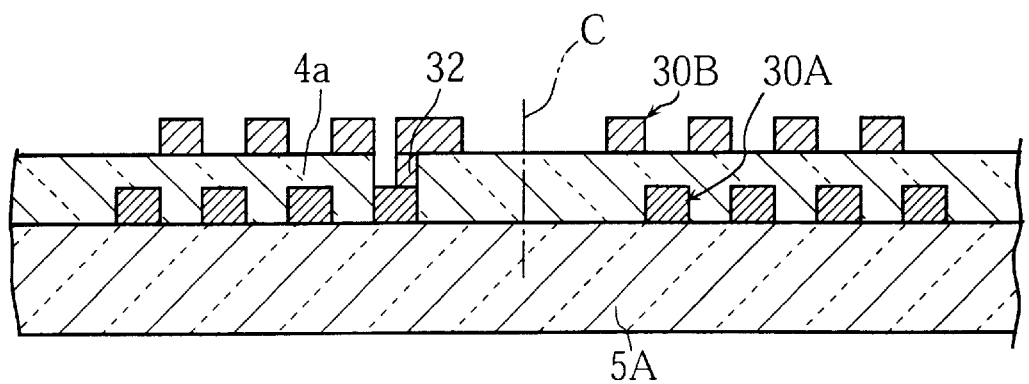
Figure 5P:
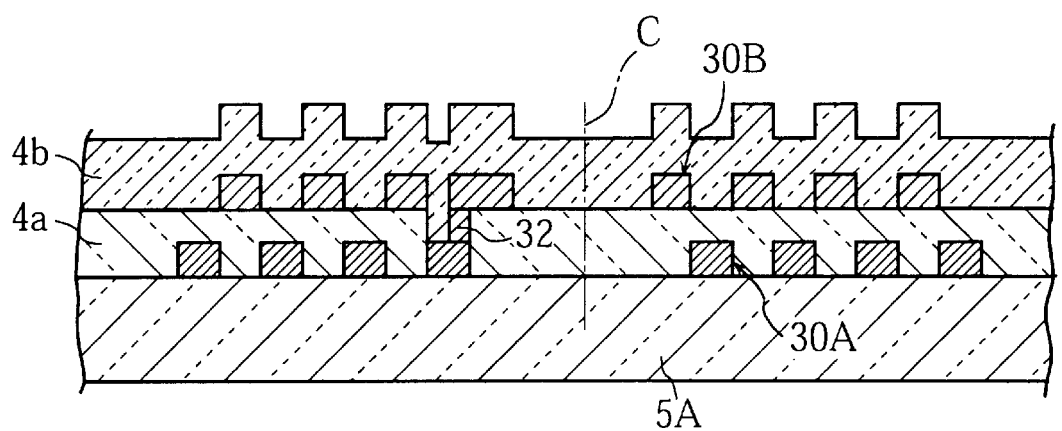
Figure 5Q:
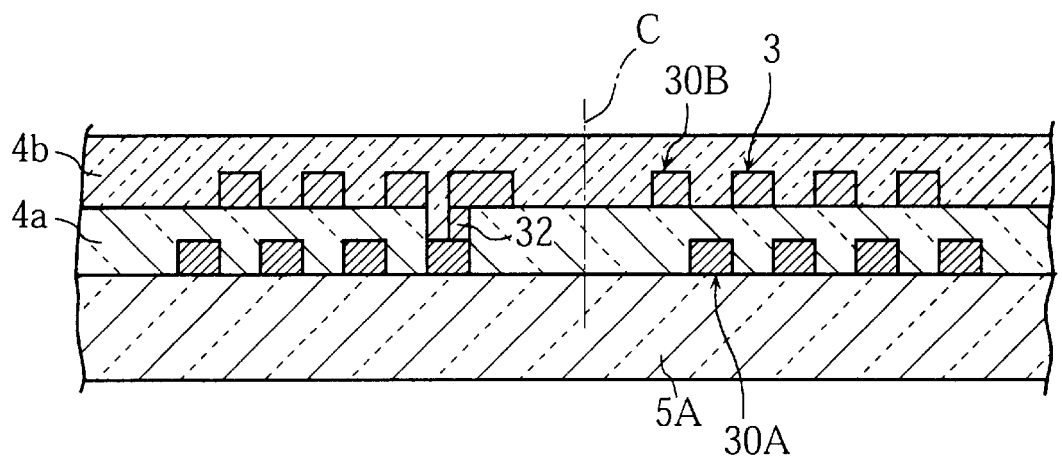

The coil 3 of the above-described MO head H1 may be fabricated in the manner shown in FIGS. 5A–5Q.

First, as shown in FIG. 5A, a base layer 60A of copper is formed on a transparent substrate 5A by sputtering or evaporation for example. The thickness of the layer 60A may be about 0.1 μm. Though not illustrated, a thin auxiliary layer of titanium or chromium is formed beforehand, so that the base layer 60A is properly attached to the substrate 5A.

Then, as shown in FIG. 5B, a resist layer 61A is formed on the base layer 60A by lithography. The resist layer 61A has a thickness of about 6 μm for example. The pattern of the resist layer 61A corresponds to the spiral configuration of the first pattern 30A of the coil 3.

Then, as shown in FIG. 5C, a copper layer 62A is formed on the base layer 60A by a electroplating technique to fill the spiral pattern of the resist layer 61A. The copper layer 62A has a thickness of about 3 μm for example.

Then, as shown in FIG. 5D, the resist layer 61A is removed by cleaning with the use of acetone for example. Thereafter, as shown in FIG. 5E, the exposed base layer 60A is removed by e.g. wet cleaning with the use of acid etching solution or dry cleaning with the use of ionized argon gas caused to impinge on the base layer 60A (ion milling). As a result of the removal, a copper spiral pattern (the first pattern 30A) is formed on the substrate 5A. Though not illustrated, the outgoing line 35a (see FIG. 3) is formed simultaneously with the first pattern 30A.

Then, as shown in FIG. 5F, a first transparent insulating layer 4a is formed on the substrate 5A to enclose the first pattern 30A and to fill the central portion 31a inside of the first pattern 30A. (In the figure, the sign "C1" refers to the central axis of the first pattern 30A.) The transparent layer 4a may be made of aluminum oxide by ion plating. The thickness of the layer 4a is about 6 $\mu$m for example. Initially, there may be some irregularities on the upper surface of the layer 4a since the layer 4a overlaps the first pattern 30A. To flatten the uneven upper surface, as shown in FIG. 5G, the layer 4a is subjected to e.g. mechanical polishing. When the initial thickness of the layer 4a is rather small, the first pattern 30A may be exposed from the insulating layer 4a as a result of the surface polishing. In this case, an additional transparent layer is formed on the layer 4a to cover the exposed parts of the pattern 30A. The additional layer is made of the same insulating material as used for forming the layer 4a.

Then, as shown in FIG. 5H, a resist layer 61B is formed on the first insulating layer 4a by lithography. The thickness of the resist layer 61B may be about 2 $\mu$m. The resist layer 61B is provided with a hole 63a to expose a part of the insulating layer 4a.

Then, as shown in FIG. 5I, the exposed part of the insulating layer 4a is etched away. Thus, a part of the inner portion of the first pattern 30A is exposed.

Then, as shown in FIG. 5J, the resist layer 61B is removed. Then, as shown in FIG. 5K, a second base layer 60B, which is similar to the first base layer 60A, is formed to cover the insulating layer 4a and the exposed portion of the first pattern 30A.

Then, as shown in FIG. 5L, a second resist layer 61C is formed in a predetermined pattern.

Then, as shown in FIG. 5M, a copper layer 62B is formed by e.g. copper plating. At this time, the copper layer 62B comes into contact with the inner portion of the first pattern 30A.

Then, as shown in FIG. 5N, the resist layer 61C is removed.

Then, as shown in FIG. 5O, the exposed portion of the second base layer 60B is removed. Thus, the second pattern 30B is obtained. Though not illustrated, the second outgoing line 38b is formed simultaneously with the second pattern 30B. The second pattern 30B is connected to the first pattern 30A via the connecting piece 32. As illustrated, the thus formed first and second patterns 30A, 3DB have a common central axis C. The inner diameter of the second pattern 30B is made smaller than that of the first pattern 30A. The first and the second patterns 30A, 30B are horizontally offset relative to each other.

Then, as shown in FIG. 5P, a second transparent layer 4b is formed on the first transparent layer 4b to enclose the second pattern 30B. The second layer 4b is made of the same insulating material as used for making the first layer 4a.

Finally, as shown in FIG. 5Q, the second layer 4b is subjected to polishing so that the upper surface of the layer 4b is flattened.

In the above-described process, the forming of the second pattern 30B is carried out after the first transparent layer 4a is flattened, as shown in FIGS. 5F and 5G. In this manner, the resulting second pattern 30B will have a substantially constant thickness, which is advantageous to preventing otherwise possible breakage of the pattern 30B.

Figure 6A:
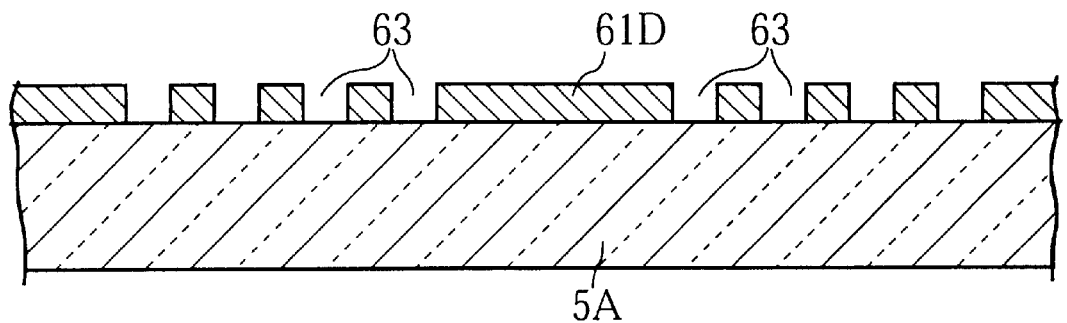
FIGS. 6A–6P show another way to make the coil of the MO head.
Figure 6B:
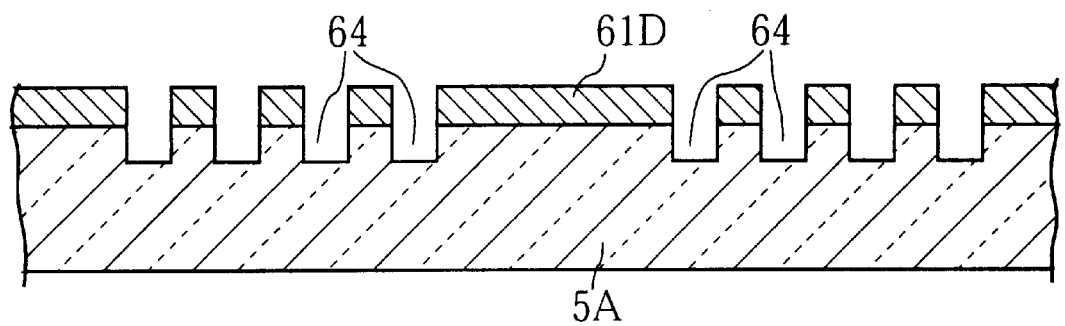
Figure 6C:
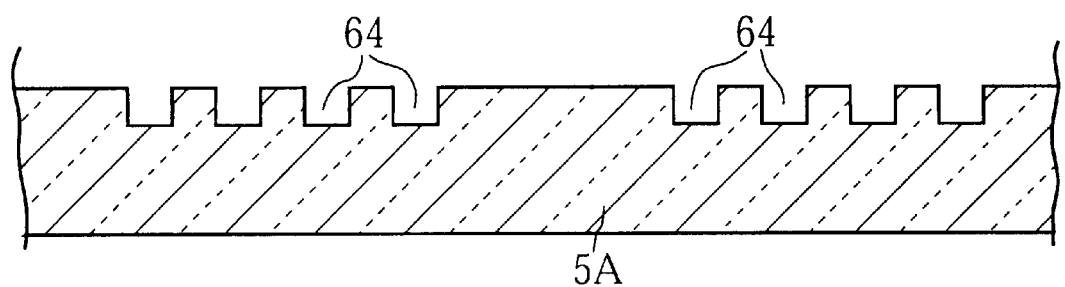
Figure 6D:
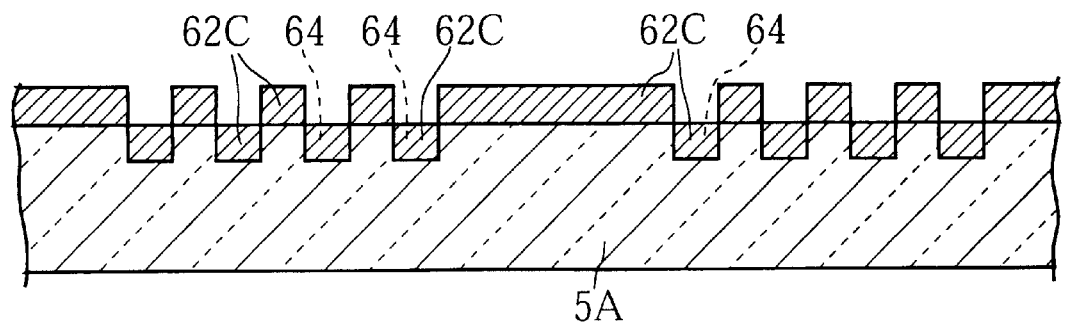
Figure 6E:
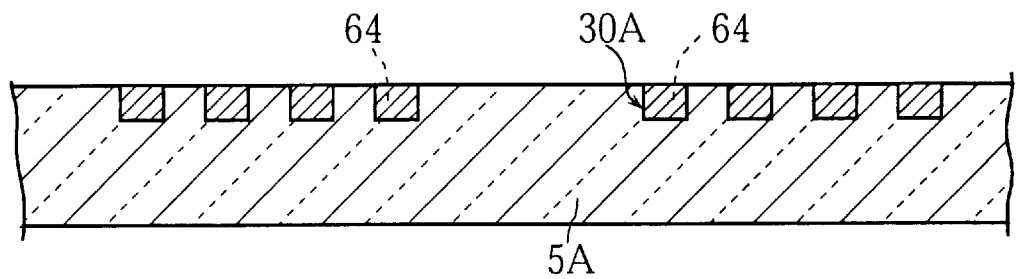
Figure 6F:
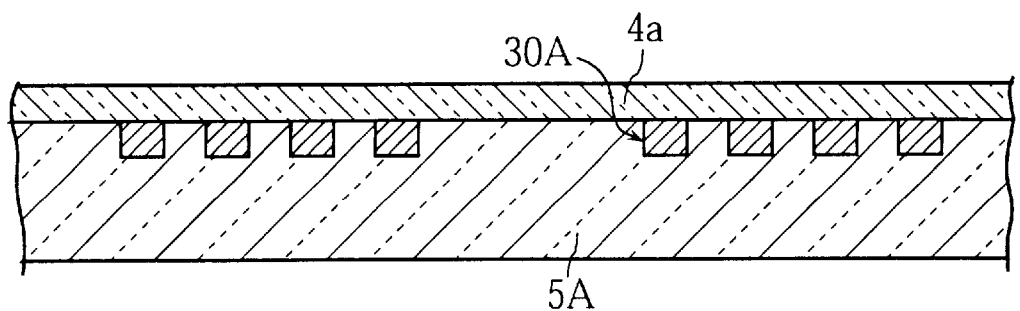
Figure 6G:
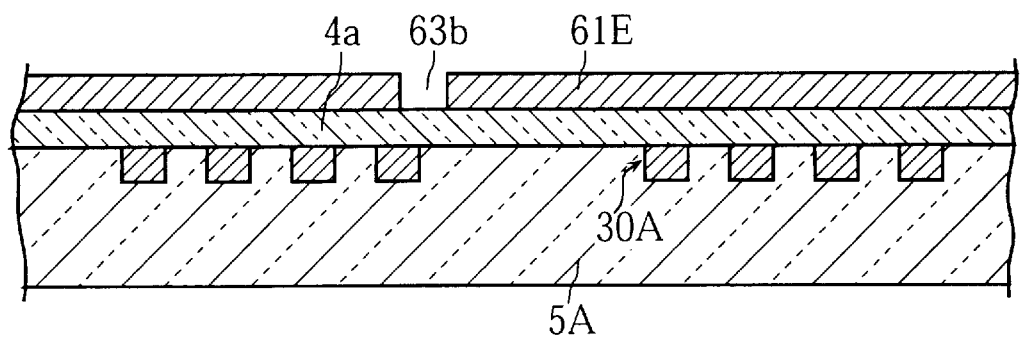
Figure 6H:
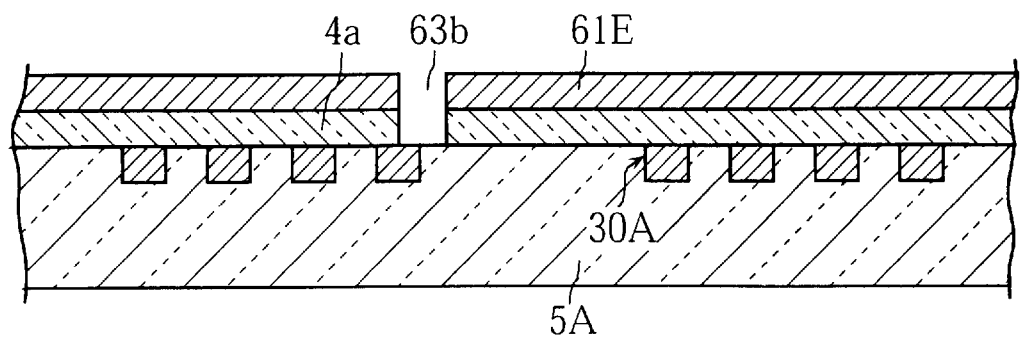
Figure 6I:
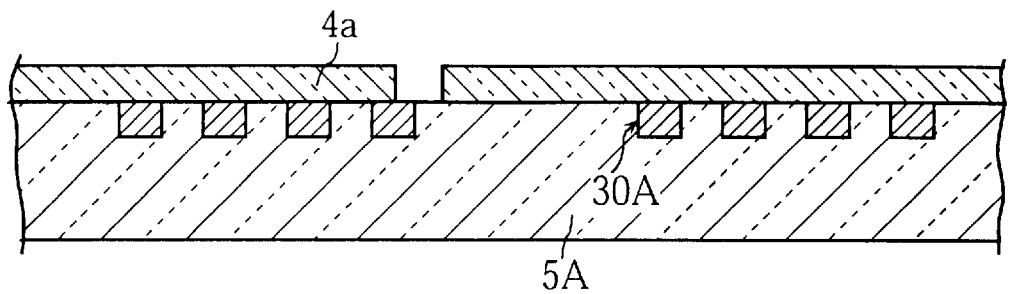
Figure 6J:
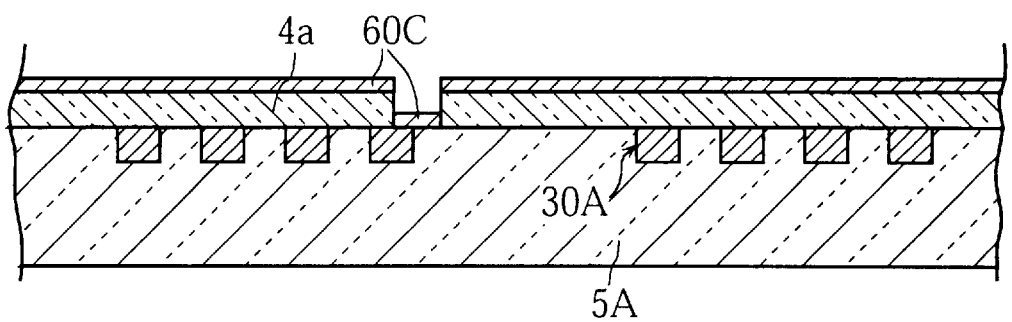
Figure 6K:
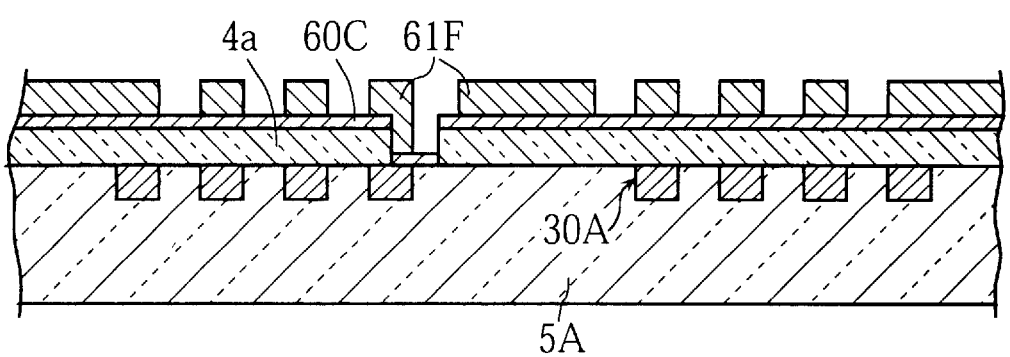
Figure 6L:
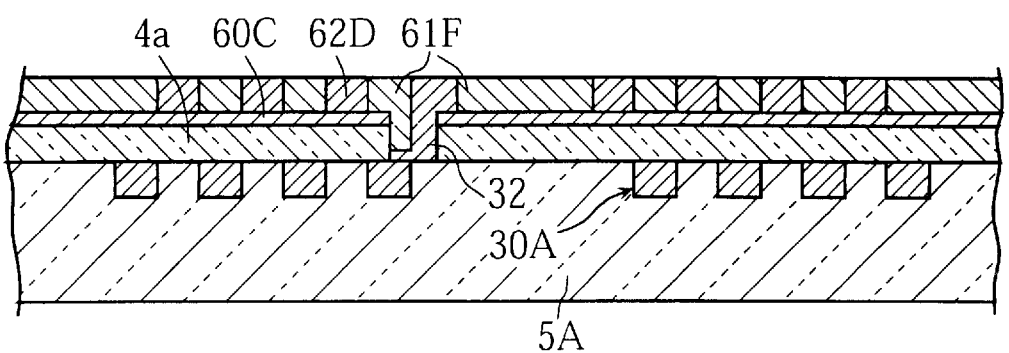
Figure 6M:
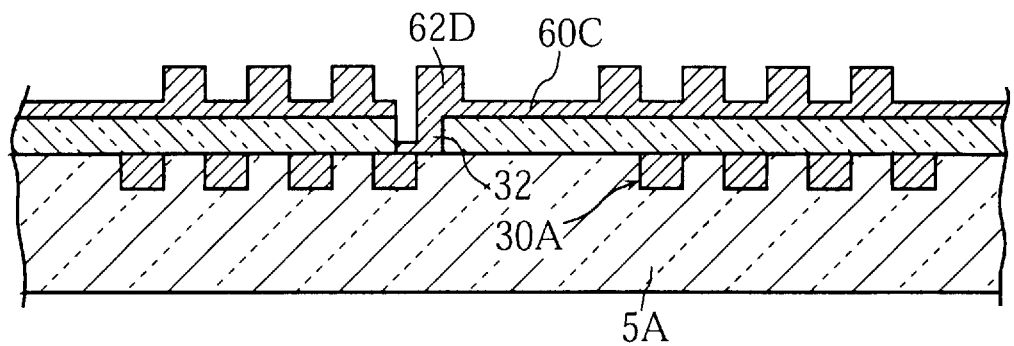
Figure 6N:
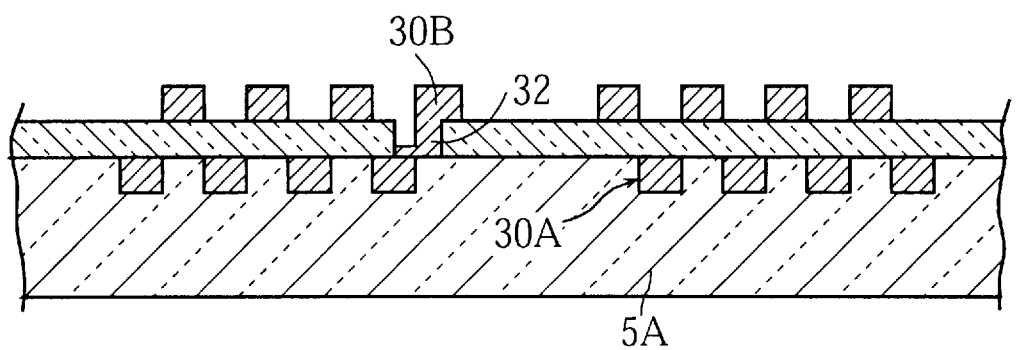
Figure 6O:
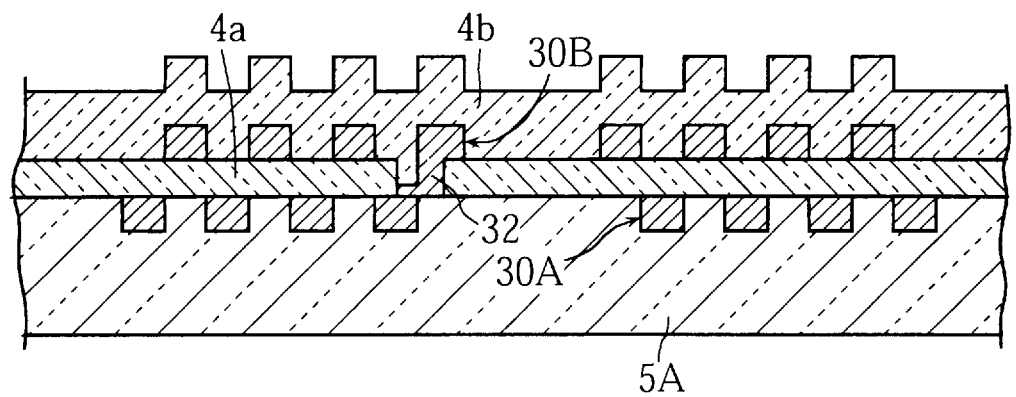
Figure 6P:
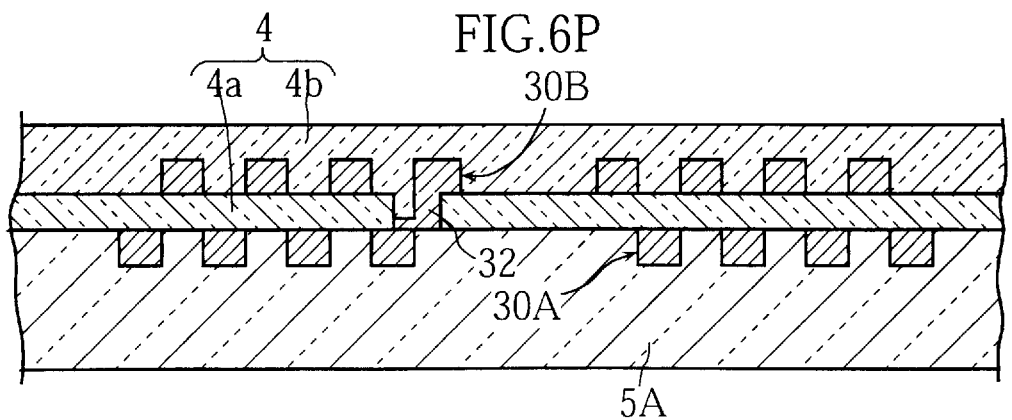

FIGS. 6A–6P illustrate a second fabrication method of the coil used for an MO head of the present invention.

First, as shown in FIG. 6A, a predetermined pattern of resist layer 61D is formed on the transparent substrate 5A. Then, as shown in FIG. 6B, grooves 64 are formed in the substrate 5A by ion milling for example. The depth of each groove 64 is about 3 $\mu$m for example.

Then, as shown in FIG. 6C, the resist layer 61D is removed. Then, as shown in FIG. 6D, a copper layer 62C is formed on the substrate 5A. As illustrated, part of the copper layer 62C fills the grooves 64.

Then, as shown in FIG. 6E, the copper layer 62C is removed from the substrate 5A except for the portion filling the grooves 64. This removal may be achieved by polishing. The remaining portion of the copper layer 62C serves as a first conductive pattern 30A of the resulting coil.

After the first pattern 30A is formed, a first transparent insulating layer 4a, a second conductive pattern 30B and a second transparent insulating layer 4b are formed in this order through the steps similar to those shown in FIGS. 5F–5O. Specifically, as shown in FIG. 6F, a first insulating layer 4a is formed on the substrate 5A to cover the first conductive pattern 30A. Then, as shown in FIG. 6G, a resist layer 61E with a hole 63b is formed on the insulating layer 4a. Thus, a portion of the insulating layer 4a is exposed through the hole 63b. Then, as shown in FIG. 6H, the exposed portion of the layer 4a is etched away. As a result, an inner part of the conductive pattern 3A is exposed to the air.

Then, as shown in FIG. 6I, the resist layer 61E is removed from the substrate 5A. Then, as shown in FIG. 6J, a base layer 60C is formed on the surface of the first layer 4a and on the exposed inner portion of the first pattern 30A.

Then, as shown in FIGS. 6K and 6L, a predetermined pattern of resist layer 61F and a conductive layer 62D (second conductive pattern 30B) are formed on the base layer 60C. At this time, a connecting piece 32 is also formed to connect the conductive layer 62D to the first pattern 30A.

Thereafter, as shown in FIGS. 6M and 6N, the resist layer 61F and the exposed base layer 60C are removed. As a result, the second conductive pattern 30B is obtained.

Finally, as shown in FIGS. 6O and 6P, a second transparent insulating layer 4b for enclosing the second pattern 30B is formed on the substrate 5A and flattened in its upper surface.

According to the second method described above, the first conductive pattern 30A is embedded in the substrate 5A. Due to this design, the transparent layer 4 (consisting of the first and the second insulating layers 4a, 4b) does not need to enclose the pattern 30A, and accordingly the thickness of the transparent layer 4 is made advantageously small.

FIGS. 7A–7L illustrate a third fabrication method of the coil used for an MO head of the present invention.

Figure 7A:
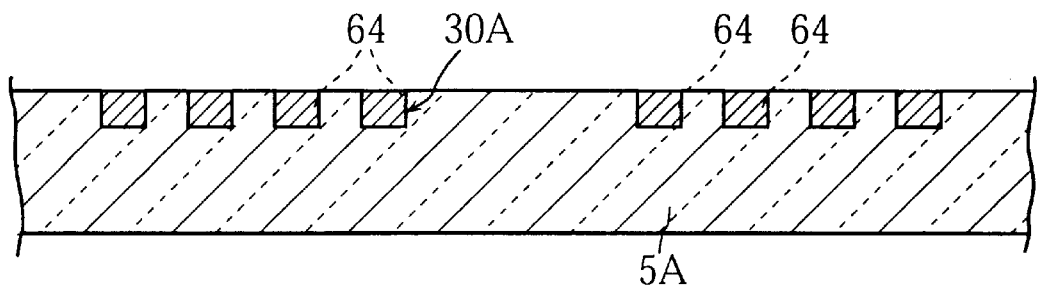
FIGS. 7A–7L show still another way to make the coil of the MO head.
Figure 7B:
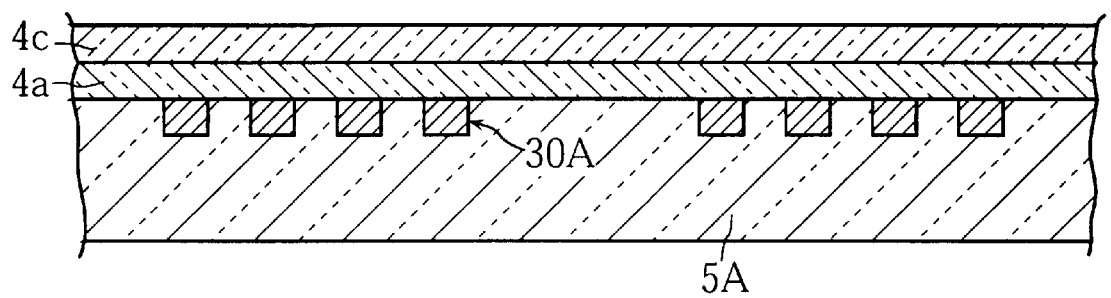

Referring to FIG. 7A, a first conductive pattern 30A, embedded in a transparent substrate 5A, is formed in the same manner as described in reference to FIGS. 6A–6E. Then, as shown in FIG. 7B, a first transparent insulating layer 4a and a third transparent insulating layer 4c are formed on the substrate 5A. The first layer 4a may be made of silicon oxide and have a thickness of about 1 $\mu$m, while the third layer 4c may be made of silicon nitride and have a thickness smaller than that of the first layer 4a (300–400 nm for example).

Figure 7C:
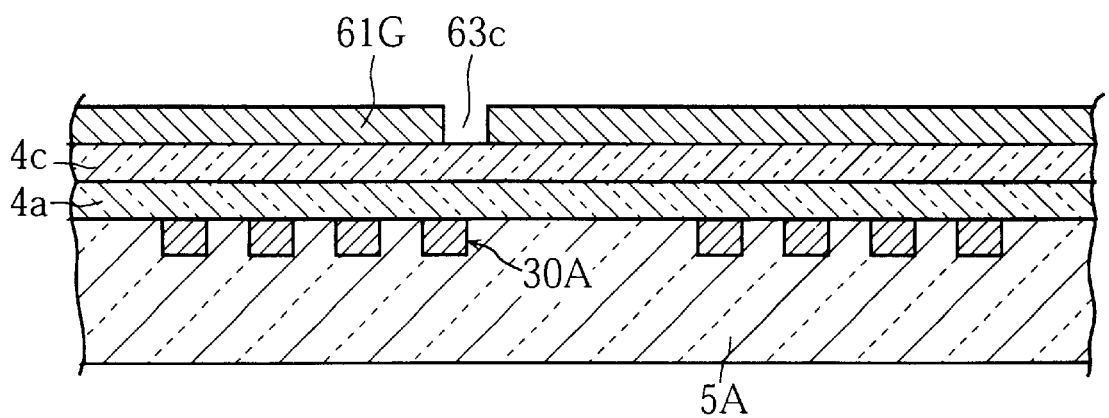
Figure 7D:
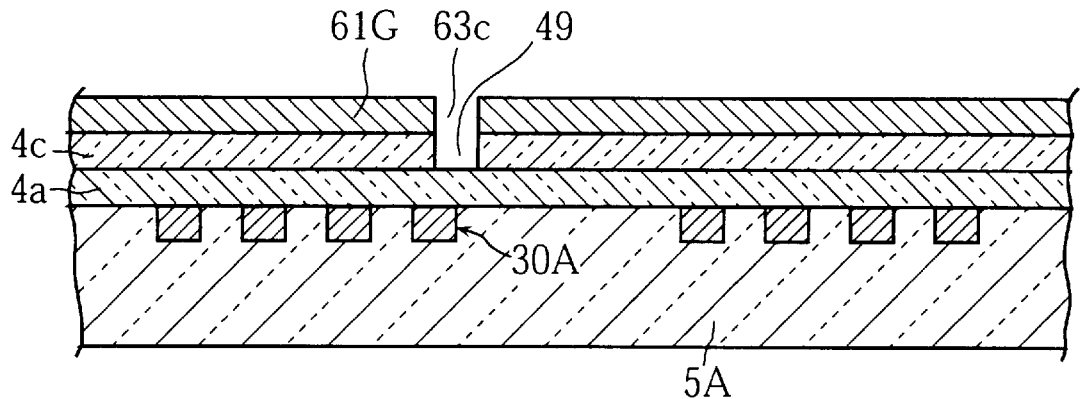
Figure 7E:
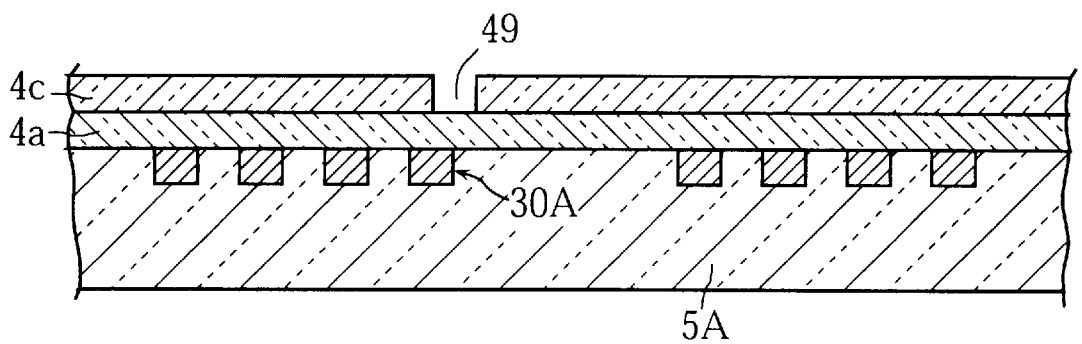
Figure 7F:
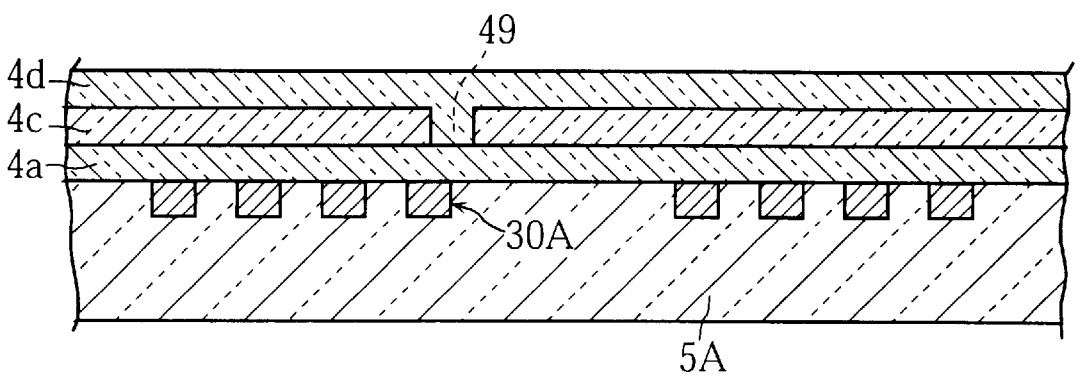

Then, as shown in FIG. 7C, a resist layer 61G with a hole 63c is formed on the third insulating layer 4c. Then, as shown in FIG. 7D, a hole 49 corresponding in position to the hole 63c of the resist layer 61G is formed in the third insulating layer 4c by etching. Then, as shown in FIGS. 7E and 7F, the resist layer 61G is removed, and a fourth transparent insulating layer 4d is formed on the third insulating layer 4c. As shown in FIG. 7F, the fourth layer 4d fills the hole 49 of the third insulating layer 4c. The fourth layer 4d may be made of the same material as used to form the first insulating layer 4a, so that these two layers can be etched with the use of the same etchant.

Figure 7G:
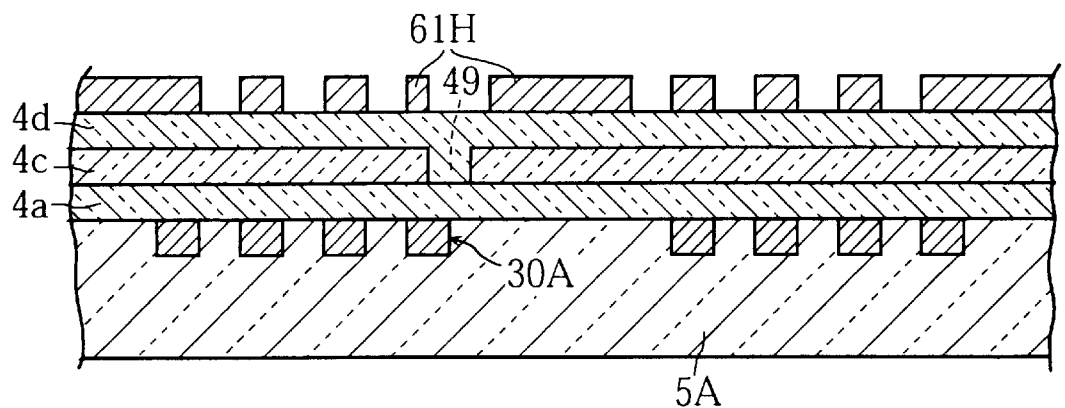
Figure 7H:
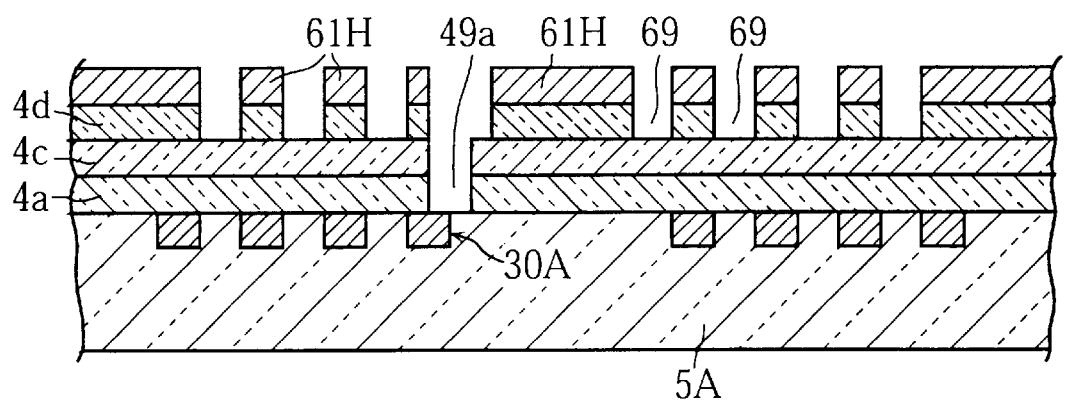

After the fourth layer 4d is formed, a predetermined pattern of resist layer 61H is formed on the fourth layer 4d, as shown in FIG. 7G. Then, the fourth layer 4d is subjected to etching to produce a plurality of grooves 69 in the fourth layer 4d. In this etching step, the protruding portion of the fourth layer 4d held in the hole 49 of the third layer 4c is etched away, which causes a portion of the first layer 4a adjacent to the hole 49 to be exposed to the etchant. Since the first layer 4a is made of the same material used for the fourth layer 4d, as stated above, this particular portion of the layer 4a is also etched away by the applied etchant. As a result, as shown in FIG. 7H, a hole 49a extending through the three layers 4a, 4c and 4d is formed simultaneously with the above-mentioned grooves 69 in the layer 4d.

Figure 7I:
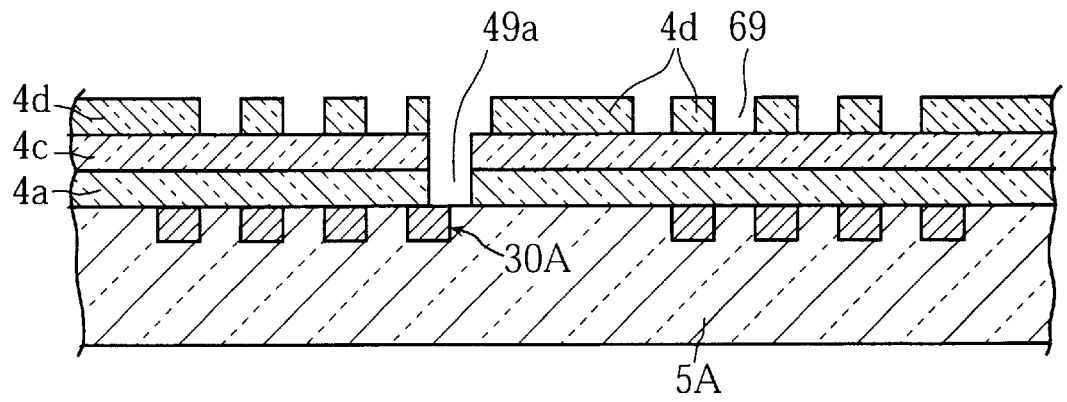
Figure 7J:
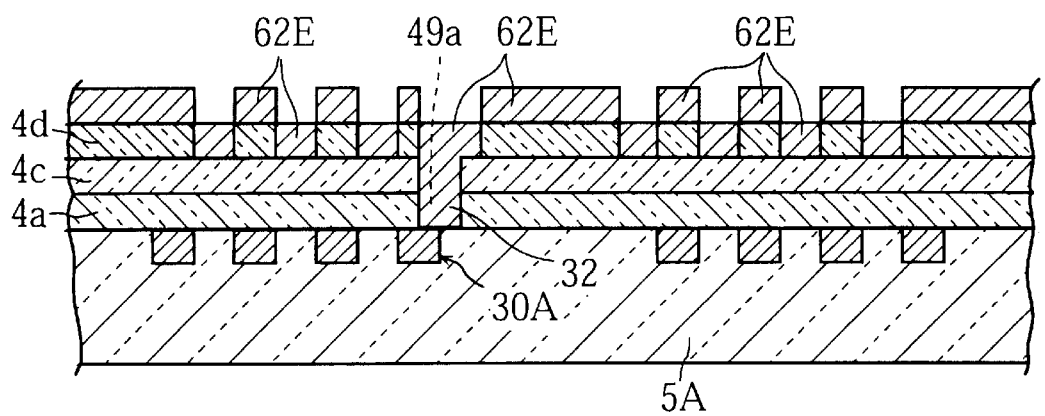
Figure 7K:
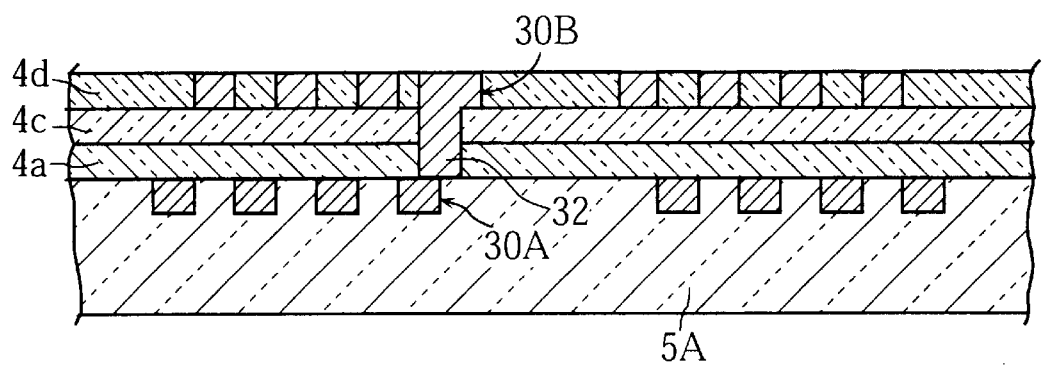
Figure 7L:
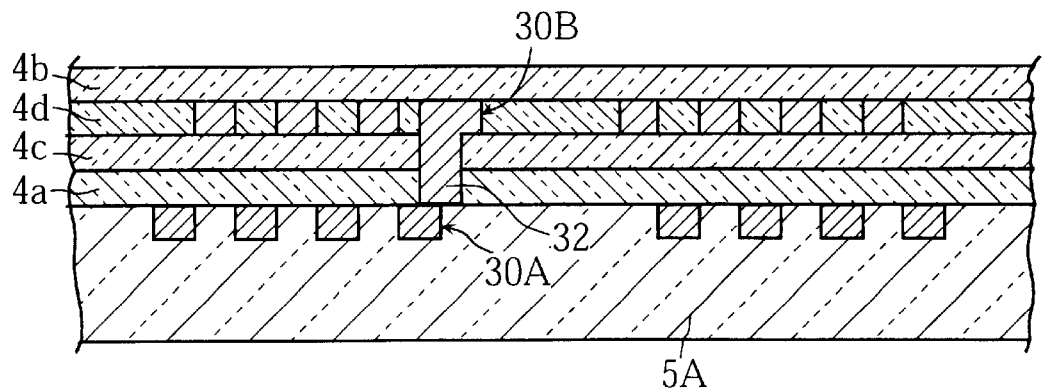

Then, as shown in FIG. 7I, the resist layer 61H is removed. Thereafter, as shown in FIG. 7J, a conductive layer 62E is formed on the substrate 5A. Then, as shown in FIG. 7K, the unnecessary upward protrusions of the conductive layer 62E are removed by polishing for example. Thus, the second conductive pattern 30B, connected to the first conductive pattern 30A via a connecting piece 32, is obtained. Finally, as shown in FIG. 7L, a second transparent insulating layer 4b is formed to cover the second conductive pattern 30B.

Figure 8:
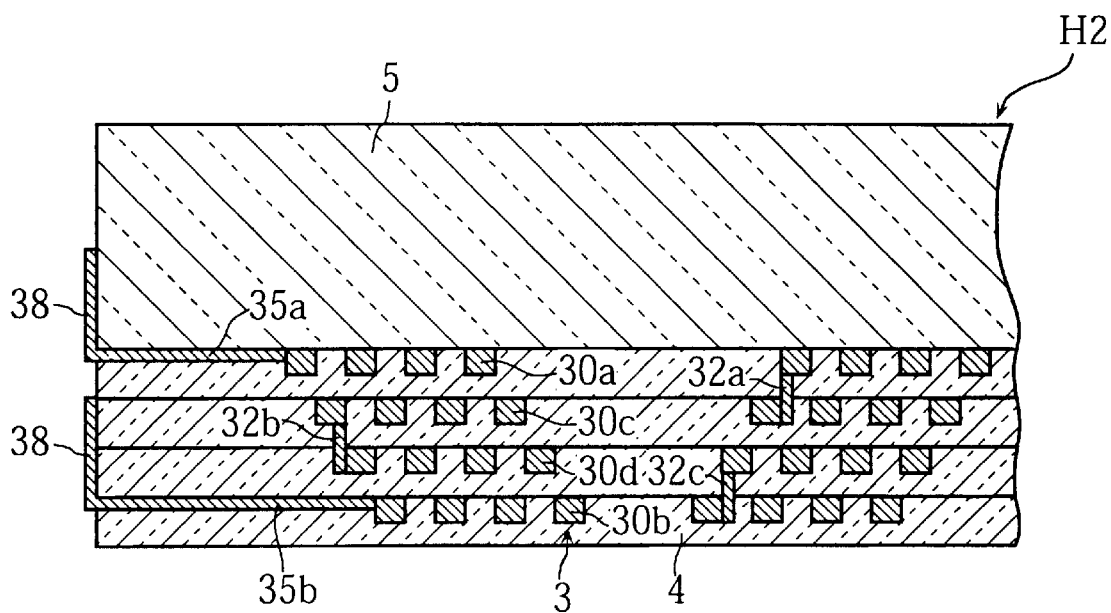
FIG. 8 is a sectional view showing the principal portion of an MO head according to a second embodiment of the present invention.

FIG. 8 shows an MO head H2 according to a second embodiment of the present invention. The head H2 is provided with a coil 3, a transparent insulating layer 4 and a transparent substrate 5. The coil 3 includes first to fourth conductive patterns 30a–30d each of which is provided with a plurality of turns. As illustrated, the third and the fourth patterns 30c, 30d are arranged between the first (uppermost) pattern 30a and the second (lowermost) pattern 30b. The inner diameters of the first, third, fourth and second patterns are made smaller in this order.

The four conductive patterns 30a–30d are electrically connected. Specifically, the first and the third patterns 30a, 30c are connected to each other at their inner ends via a first connecting piece 32a. The third and the fourth patterns 30c, 30d are connected to each other at their outer ends via a second connecting piece 32b. The fourth and the second patterns 30d, 30b are connected to each other at their inner ends via a third connecting piece 32c.

The MO head H2 is also provided with first and second outgoing lines 35a, 35b. The first outgoing line 35a is connected to an outer portion of the first conductive pattern 30a, while the second outgoing line 35b is connected to an outer portion of the second conductive pattern 30b. At their exposed ends, the outgoing lines 35a, 35b are connected to terminals 38.

In the preferred embodiment shown in FIG. 8, use is made of four conductive patterns for the coil 3. According to the present invention, a larger even number of conductive patterns may be used for constituting the coil 3. An even number of conductive patterns are advantageous since the two outgoing lines 35a, 35b are each connected to a radially outer portion of the uppermost conductive pattern (pattern 30a in FIG. 8) or lowermost conductive pattern (pattern 30d in FIG. 8). If an odd number of conductive patterns are used, the first outgoing line 35a may be connected to an outer portion of the uppermost conductive pattern, whereas the other outgoing line 35b needs to be connected to an inner portion of the lowermost conductive pattern. In such an instance, disadvantageously, the laser beam passing though the center of the coil 3 may be interfered with by the second outgoing line 35b or by an via-hole connected to the inner portion of the lowermost conductive pattern.

Figure 9:
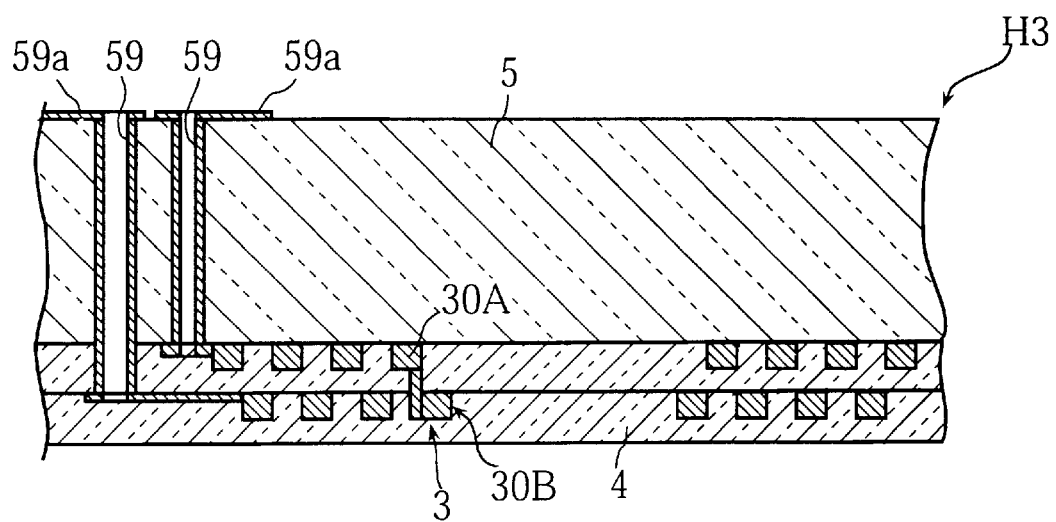
FIG. 9 is a sectional view showing the principal portion of an MO head according to a third embodiment of the present invention.

FIG. 9 shows an MO head H3 according to a third embodiment of the present invention. The head H3 is provided with a coil 3 (consisting of two conductive patterns 30A and 30B), a transparent insulating layer 4 to enclose the coil 3, and a transparent substrate 5. In this embodiment, two via-holes 59 extending through the substrate 5 are provided. As illustrated, one of the two via-holes 59 is connected to the first conductive pattern 30A, while the other is connected to the second conductive pattern 30B. Two external terminals 59a, provided on the upper surface of the substrate 5, are connected to the via-holes 59.

Figure 10:
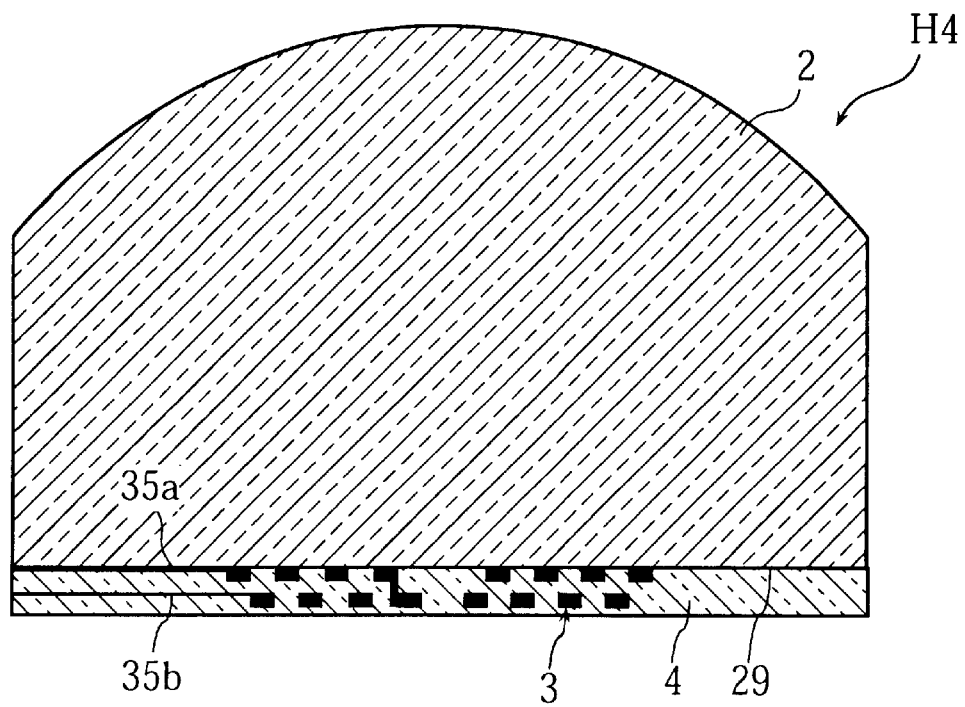
FIG. 10 is a sectional view showing an MO head according to a fourth embodiment of the present invention.
Figure 11:
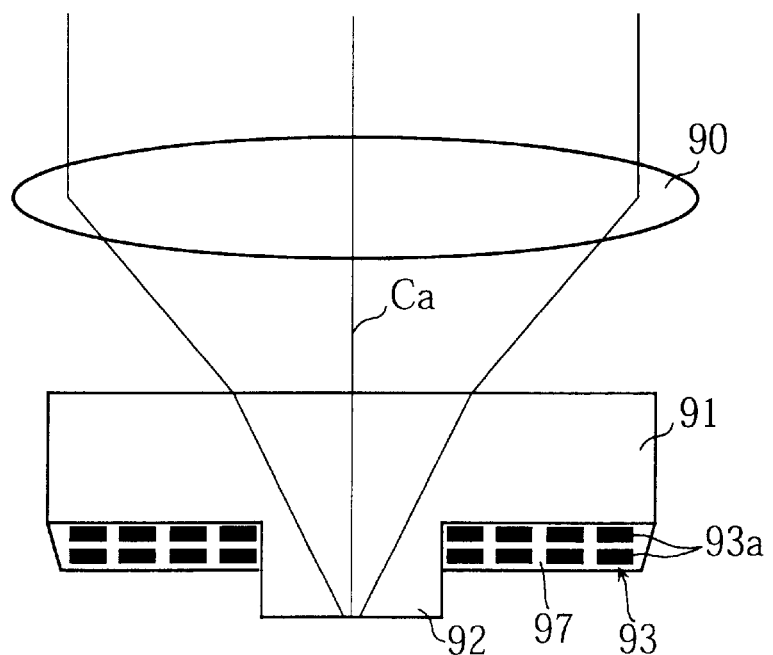
FIG. 11 shows a conventional MO head.
Figure 12B:
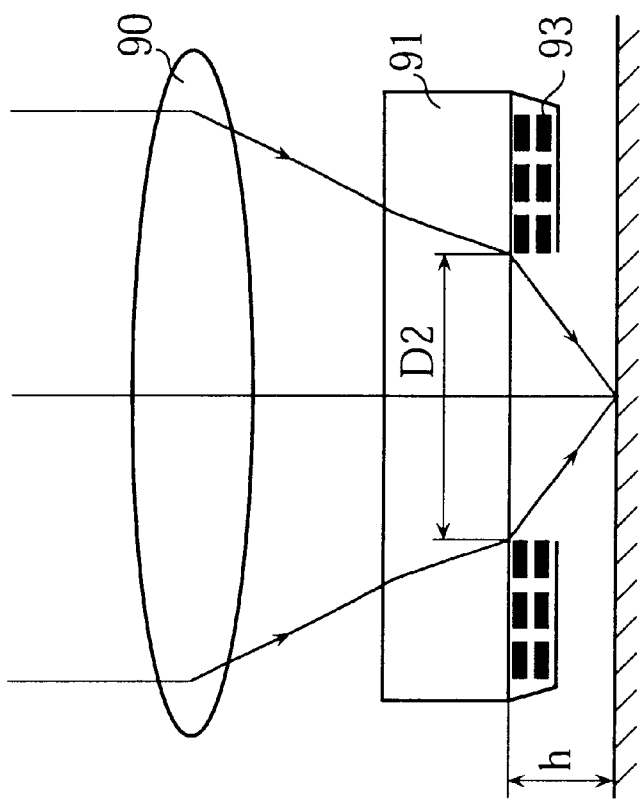
FIG. 12B illustrates the behavior of the laser beam where no downward projection is provided.
Figure 12A:
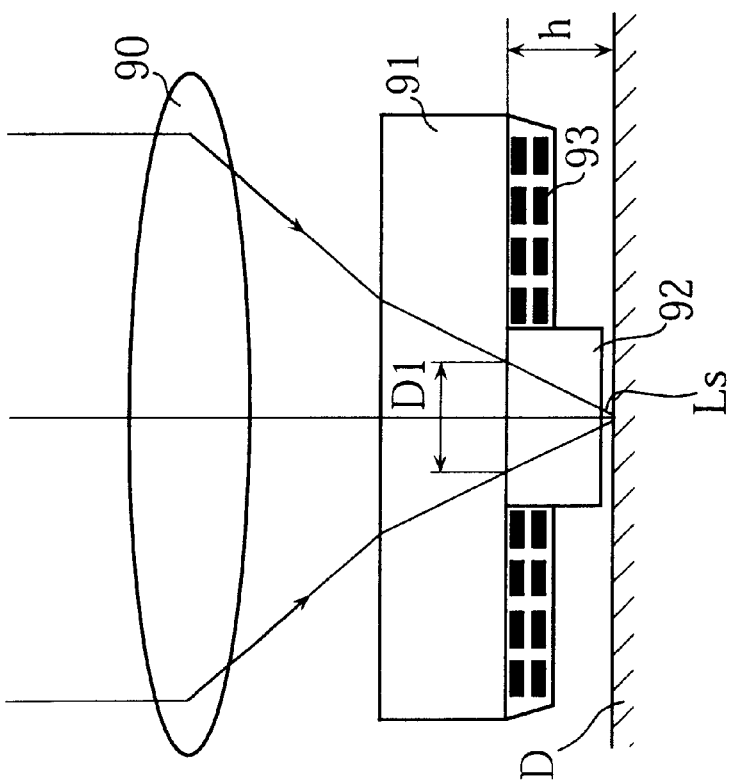
Figure 13:
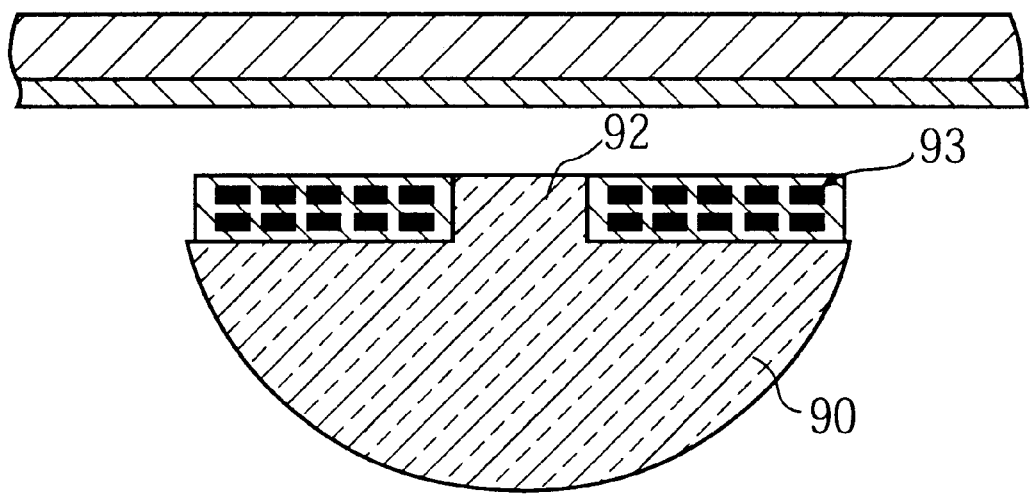
FIG. 13 shows another example of conventional MO head.

FIG. 10 shows an MO head H4 according to a fourth embodiment of the present invention. The head H4 is provided with an objective lens 2, a coil 3 provided on the bottom surface 29 of the lens 2, and an transparent insulating layer 4 enclosing the coil 3. The coil 3 consists of two conductive patterns connected to outgoing lines 35a, 35b. The MO head H4 is advantageous to e.g. cost reduction or weight reduction since it does not need a transparent substrate 5 (see e.g. FIG. 9) prepared separately from the lens 2.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A magneto-optical head comprising:
   a slider held in facing relation to a storage medium;
   an objective lens supported by the slider for concentrating light rays;
   a coil provided with a center through which the light rays pass, the coil including a first conductive pattern and a second conductive pattern which is closer to the storage medium than the first conductive pattern is; and
   a transparent insulating layer enclosing the coil, the transparent insulating layer having an outer surface facing the storage medium;
   wherein the second conductive pattern is smaller in inner diameter than the first conductive pattern, an entire portion inside the coil is occupied only by the transparent insulating layer; and
   wherein the objective lens combined with the transparent insulating layer provides a focal point located beyond the outer surface of the transparent insulating layer away from the objective lens.

2. The magneto-optical head according to claim 1, further comprising a transparent substrate arranged between the lens and the storage medium, the coil being provided directly on the substrate.

3. The magneto-optical head according to claim 2, wherein the substrate and the insulating layer have substantially same refractive indexes.

4. The magneto-optical head according to claim 2, wherein the substrate is provided with via-holes connected to the first and the second conductive patterns.

5. The magneto-optical head according to claim 2, wherein the first conductive pattern is embedded in the substrate.

6. The magneto-optical head according to claim 1, wherein the coil is provided on the lens.

7. The magneto-optical head according to claim 1, wherein each of the first and the second conductive patterns is provided with a plurality of turns.

8. The magneto-optical head according to claim 7, wherein the turns of the first conductive pattern are offset radially of the coil from the turns of the second conductive pattern.

9. The magneto-optical head according to claim 7, wherein the coil includes a connecting piece for connecting an inner turn of the first conductive pattern to an inner turn of the second conductive pattern.

10. The magneto-optical head according to claim 7, wherein the coil includes a first outgoing line connected to an outer turn of the first conductive pattern, and a second outgoing line connected to an outer turn of the second conductive pattern.

11. The magneto-optical head according to claim 1, wherein the coil includes third and fourth conductive patterns arranged between the first and the second conductive patterns, the third and the fourth conductive patterns being smaller in inner diameter than the first conductive pattern but greater in inner diameter than the second conductive pattern.

12. The magneto-optical head according to claim 11, wherein the coil is provided with a first connecting piece for connecting an inner end of the first conductive pattern to an inner end of the third conductive pattern, a second connecting piece for connecting an outer end of the third conductive pattern to an outer end of the fourth conductive pattern, and a third connecting piece for connecting an inner end of the fourth conductive pattern to an inner end of the second conductive pattern.

13. A method of making a coil for a magneto-optical head comprising the steps of:

forming a first conductive pattern on a transparent substrate;

forming a first transparent insulating layer filling a center of the first conductive pattern;

forming a second conductive pattern on the first insulating layer, the second conductive pattern being smaller in inner diameter than the first conductive pattern; and forming a second transparent insulating layer filling a center of the second conductive pattern;

wherein the step of forming the second conductive pattern comprises the sub-steps of:

forming on the first insulating layer a third transparent insulating layer provided with a hole;

forming a fourth transparent insulating layer to cover the third insulating layer:

etching the fourth insulating layer and a part of the first insulating layer via the hole of the third insulating layer, so that a second recess corresponding to the second conductive pattern is formed in the fourth insulating layer, and a through-hole communicating with the second recess is formed in the first and the third insulating layers; and supplying a conductive material for filling the second recess and the through-hole.

14. The method according to claim 13, further comprising the step of flattening a surface of the first insulating layer before the second conductive pattern is formed.

15. The method according to claim 13, further comprising the step of forming a first recess in the substrate for embedding the first conductive pattern in the substrate.

16. A magneto-optical head comprising:

a slider held in facing relation to a storage medium;

an objective lens supported by the slider for concentrating light rays;

a coil provided with a center through which the light rays pass, the coil including a first conductive pattern and a second conductive pattern which is closer to the storage medium than the first conductive pattern is; and a transparent insulating layer enclosing the coil, the transparent insulating layer having an outer surface facing the storage medium;

wherein the second conductive pattern is smaller in inner diameter than the first conductive pattern, the insulating layer filling the center of the coil;

wherein the coil includes third and fourth conductive patterns arranged between the first and the second conductive patterns, the third and the fourth conductive patterns being smaller in inner diameter than the first conductive pattern but greater in inner diameter than the second conductive pattern; and wherein the coil is provided with a first connecting piece for connecting an inner end of the first conductive pattern to an inner end of the third conductive pattern, a second connecting piece for connecting an outer end of the third conductive pattern to an outer end of the fourth conductive pattern, and a third connecting piece for connecting an inner end of the fourth conductive pattern to an inner end of the second conductive pattern.

* * * * *